United States Patent
Strand et al.

(10) Patent No.: US 11,850,547 B2
(45) Date of Patent: Dec. 26, 2023

(54) GAS CAPTURE SYSTEM

(71) Applicant: COMPACT CARBON CAPTURE AS, Bergen (NO)

(72) Inventors: Asbjørn Strand, Bergen (NO); Dag A Eimer, Porsgrunn (NO); Arild Vik, Blomsterdalen (NO); Øyvind Torvanger, Nyborg (NO); Jiru Ying, Porsgrunn (NO)

(73) Assignee: Compact Carbon Capture AS, Bergen (NO)

( * ) Notice: Subject to any disclaimer, the term of this patent is extended or adjusted under 35 U.S.C. 154(b) by 613 days.

(21) Appl. No.: 16/649,019

(22) PCT Filed: Sep. 21, 2018

(86) PCT No.: PCT/EP2018/075687
§ 371 (c)(1),
(2) Date: Mar. 19, 2020

(87) PCT Pub. No.: WO2019/057932
PCT Pub. Date: Mar. 28, 2019

(65) Prior Publication Data
US 2020/0289976 A1    Sep. 17, 2020

(30) Foreign Application Priority Data
Sep. 22, 2017    (GB) ..................... 1715374

(51) Int. Cl.
*B01D 53/14* (2006.01)
*B01D 53/18* (2006.01)
*C10L 3/10* (2006.01)

(52) U.S. Cl.
CPC ....... *B01D 53/185* (2013.01); *B01D 53/1406* (2013.01); *B01D 53/1412* (2013.01);
(Continued)

(58) Field of Classification Search
None
See application file for complete search history.

(56) References Cited

U.S. PATENT DOCUMENTS 6,007,055 A * 12/1999 Schifftner ............. B01D 53/18
                                                              96/321
9,216,377 B1* 12/2015 Dutra E Mello ....... C10L 3/106
(Continued)

FOREIGN PATENT DOCUMENTS

CN    203389355 U    1/2014
CN    204320287 U    5/2015
(Continued)

OTHER PUBLICATIONS

International Search Report and Written Opinion of the ISA issued in PCT/EP2018/075687, dated Jan. 25, 2019; ISA/EP.
(Continued)

*Primary Examiner* — Tam M Nguyen
(74) *Attorney, Agent, or Firm* — Paul Frank + Collins P.C.

(57) ABSTRACT

Disclosed herein is a rotating packed bed, RPB, for mass transfer between a sorbent and a gas, the RPB comprising: a central chamber arranged to receive a flow of a sorbent that is a liquid; and a flow path for the sorbent between the central chamber and a region for mass transfer between a gas and the sorbent; wherein, in use, the flow of sorbent through the region for mass transfer is substantially in cross-flow with the flow of gas through the region for mass transfer. Advantageously, mass transfer between a liquid sorbent and a gas is improved.

20 Claims, 21 Drawing Sheets

Figure 1:
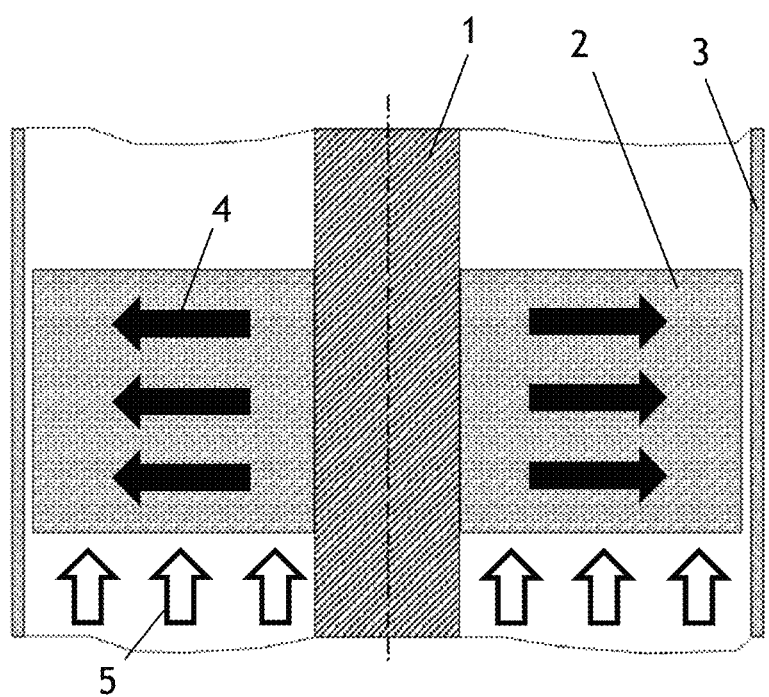

(52) U.S. Cl.
CPC .......... B01D 53/1475 (2013.01); C10L 3/104 (2013.01); *B01D 2252/20484* (2013.01); *C10L 2290/541* (2013.01)

(56) References Cited

U.S. PATENT DOCUMENTS

| | | | |
|---|---|---|---|
| 10,168,047 | B2 | 1/2019 | Satoh et al. |
| 2003/0089232 | A1 | 5/2003 | Eimer |
| 2010/0011956 | A1 | 1/2010 | Neumann et al. |
| 2012/0222555 | A1* | 9/2012 | Gupta ................. C01B 17/0408 502/79 |
| 2013/0309139 | A1 | 11/2013 | Kimura |
| 2016/0059178 | A1* | 3/2016 | Fiveland ............ B01D 53/1462 96/187 |
| 2016/0317995 | A1* | 11/2016 | Chen .................. B01D 53/1493 |
| 2022/0219132 | A1* | 7/2022 | Luo ..................... B01D 53/1468 |

FOREIGN PATENT DOCUMENTS

| | | |
|---|---|---|
| CN | 204522361 U | 8/2015 |
| DE | 10051523 A1 | 5/2001 |
| EP | 0020055 A1 | 12/1980 |
| EP | 2335803 A1 | 6/2011 |
| EP | 2648827 B1 | 4/2016 |
| JP | 2011125763 A | 6/2011 |
| WO | WO-2013106974 A1 | 7/2013 |
| WO | WO-2016038480 A1 | 3/2016 |
| WO | WO-2016137561 A1 | 9/2016 |

OTHER PUBLICATIONS

GB Search and Examination Report under Sections 17 and 18(3) issued in Application No. GB1715374.3, dated Nov. 1, 2017.
<http://www.sulzer.com/nb/Products-and-Services/Separation-Technology/Structured-Packings/Mellapak-MellapakPlus-Mellapak-Plastic>.
<http://nearyou.imeche.org/docs/default-source/Staffordshire-Area/metal-foams-in-aerospace.pdf?sfvrsn=0>.
NETL 2013 Case 9 : NETL, 2013. Cost and Performance Baseline for Fossil Energy Plants, vol. 1: Bituminous Coal and Natural Gas to Electricity. DOE/2010/1397, Revision 2a.

* cited by examiner

GAS CAPTURE SYSTEM

CROSS-REFERENCE TO RELATED APPLICATIONS

This application is a U.S. National Phase Application under 35 U.S.C. 371 of International Application No. PCT/EP2018/075687 filed on Sep. 21, 2018, which claims the benefit of Great Britain Patent Application No. 1715374.3 filed on Sep. 22, 2017. The entire disclosures of the above applications are incorporated herein by reference.

FIELD

The present disclosure relates to gas capture systems and processes. A gas capture system reduces the concentration of at least one gas in a mixture of gasses. For example, a gas capture system may clean a dirty gas, such as a flue gas, and the gas capture reduce the concentration of carbon dioxide in the dirty gas before it is released into the atmosphere. Another example is the gas mixture being a mixture of hydrogen and carbon dioxide, as may be generated by a reforming process. The gas capture system may reduce the concentration of carbon dioxide in the gas mixture to generate substantially pure hydrogen. The gas capture system according to embodiments comprises one or more rotating packed beds that advantageously comprise a number of features for providing effective mass transfer between a received gas mixture and a liquid sorbent of at least one gas in the received gas mixture. The gas capture system of embodiments has a relatively low volume and is therefore suitable for applications in which a compact gas capture system is required, such as on offshore platforms.

BACKGROUND

A known technology for greatly reducing the amount of carbon dioxide released into the atmosphere due to the combustion of fossil fuels is carbon capture and storage, CCS.

A post combustion CCS system removes carbon dioxide from flue gas prior to the flue gas being released into the atmosphere. A sorbent is used to capture carbon dioxide from flue gas that has been generated by fossil fuel combustion. The sorbent is typically a liquid, such as monoethanolamine, MEA.

Implementations of CCS currently only exist on very large industrial scales with the source of flue gas being a fossil fuel power plant. A packed column is provided in which carbon dioxide in flue gas is adsorbed/absorbed by the sorbent. The volume of flue gas generated by the power plant is large and approximately at atmospheric pressure. Very large absorption columns are therefore required for the mass transfer between the flue gas and the sorbent. The columns may comprise trays of liquid sorbent that the gas is bubbled through. Alternatively, the columns may comprise a packing that provides a large contact area between the sorbent and the gas. The packing may be, for example, Mellapak™ manufactured by Sulzer (see http://www.sulzer.com/nb/Products-and-Services/Separation-Technology/Structured-Packings/Mellapak-MellapakPlus-Mellapak-Plastic as viewed on Feb. 8, 2017). The flue gas is input into the bottom of the column and liquid sorbent input into the top of the column. The mass transfer occurs due to the mixing of the sorbent and the gas as the sorbent flows vertically down through the column and the gas flows vertically up through the column. For a 400 MW combined cycle gas turbine, CCGT, power plant, the linear gas velocity through the column is about 2 m/s. The diameter of the column is about 15-20 meters and a column height of about 20-40 m is required. Accordingly, the columns required for capturing a gas are very large.

An alternative design of gas capture system uses a rotating packed bed, RPB, for mixing a liquid sorbent and the gas. In an RPB, the mass transfer occurs in a packing that is rotated. Due to the artificial gravity that is introduced by the rotation, the effective contact area between the gas and sorbent is increased without causing early flooding. Advantageously, higher gas velocities through the gas capture system can be achieved and the volume of the gas capture system therefore reduced. EP0020055A1 discloses a known RPB design in which the flow of the gas and sorbent is an in-line flow.

A number of problems are experienced with known implementations of RPB gas capture systems for CCS. There is therefore a general need to improve the RPB gas capture systems.

Statements of Invention

According to a first aspect of the invention, there is provided a rotating packed bed, RPB, for mass transfer between a sorbent and a gas, the RPB comprising: a central chamber arranged to receive a flow of a sorbent that is a liquid; and a flow path for the sorbent between the central chamber and a region for mass transfer between a gas and the sorbent; wherein, in use, the flow of sorbent through the region for mass transfer is substantially in cross-flow with the flow of gas through the region for mass transfer.

Preferably, the RPB comprises: first packing material; and second packing material that is configured to provide the region for mass transfer between the gas and the sorbent; wherein, in use: the first packing material is arranged to receive sorbent from the central chamber; the second packing material is arranged to receive sorbent from the first packing material; and the sorbent flow resistance of the second packing material is less than the sorbent flow resistance of the first packing material.

Preferably, the central chamber, first packing material and second packing material are configured such that, in a cross section of the RPB: the central chamber is circular; the first packing material and second packing material are annular; the central chamber, first packing material and second packing material are concentric; the second packing material encloses the first packing material; and the first packing material encloses the central chamber.

Preferably, in use, the distribution of the sorbent on the interface between the first and second packing materials is substantially uniform.

Preferably, the RPB comprises a plurality of nozzles arranged in the flow path of the sorbent between the central chamber and the region for mass transfer.

Preferably, the RPB further comprises a second chamber; wherein: an outer wall of the second chamber comprises the plurality of nozzles; an inner wall of the second chamber comprises a plurality of openings arranged to provide a flow path of sorbent within the central chamber to the second chamber; and in a cross section of the RPB, the second chamber is annular, the first packing material encloses the second chamber, and the second chamber encloses the central chamber.

Preferably, the RPB further comprises one or more sorbent redistribution systems, wherein each sorbent redistribution system comprises: an inner annular ring of packing material; and an outer annular ring of packing material; wherein: in use, sorbent is received by the inner annular ring of packing material and flows through the inner ring of packing material to the outer ring of packing material; the outer annular ring of packing material is arranged to provide a region of mass transfer; the sorbent flow resistance of the outer annular ring of packing material is less than the flow resistance of the inner annular ring of packing material; and the inner and outer annular rings of packing material are configured such that, in a cross section of the RPB: the inner and outer annular rings of packing materials are annular and concentric with the central chamber; and the outer annular ring of packing material encloses the inner annular ring of packing material.

Preferably, the RPB further comprises a barrier between the inner annular ring of packing material and source of the flow of sorbent; wherein the barrier comprises openings arranged such that, in use, the sorbent flows through the barrier into the inner annular ring of packing material.

Preferably, the inner annular ring of packing material has the same sorbent flow resistance as the first packing material; the outer annular ring of packing material has the same sorbent flow resistance as the second packing material; and the inner annular ring of packing material encloses the second packing material.

Preferably, the RPB further comprises one or more axial compensators, wherein each axial compensator comprises a flow deflector that, in use, is arranged to change the axial component of the flow of sorbent through the RPB such that the axial component of the flow of sorbent from an inner surface of the RPB to an outer surface of the RPB is reduced.

Preferably, in use, the flow of sorbent from the inner surface of the RPB to the outer surface of the RPB is substantially radial.

Preferably, one or more of the axial compensators comprises: an inner annular ring of packing material; and an outer annular ring of packing material; wherein: in use, sorbent is received by the inner annular ring of packing material and flows through the inner ring of packing material to the outer ring of packing material; the outer annular ring of packing material is arranged to provide a region of mass transfer; the sorbent flow resistance of the outer annular ring of packing material is less than the flow resistance of the inner annular ring of packing material; and the inner and outer annular rings of packing material are configured such that, in a cross section of the RPB: the inner and outer annular rings of packing materials are annular and concentric with the central chamber; and the outer annular ring of packing material encloses the inner annular ring of packing material.

Preferably, the flow deflector is a punched metal sheet comprising an plurality of openings.

Preferably, in a plane that includes the axis of rotation of the RPB, at least the upper surface of the region for mass transfer in the RPB is curved so it extends in the direction that gas flows through the RPB.

Preferably, the regions for mass transfer have higher radial resistance to the flow of sorbent than axial resistance to the flow of gas.

Preferably, one or more of the packing materials comprises a metal mesh.

Preferably, the sorbent flow resistance of each packing material is dependent on the density of the mesh.

Preferably, one or more of the packing materials is formed by forming slots in a corrugated metal sheet.

Preferably, in a cross section of the RPB, the RPB comprises a plurality of annular concentric sections; and each of the sections comprises an inner annular ring of packing material that is enclosed by an outer annular ring of packing material, wherein the outer annular ring of packing material has a lower sorbent flow resistance than the inner annular ring of packing material.

Preferably, the number of sections is in the range 2 to 6.

Preferably, the sorbent flow resistance of the outer annular ring of packing material is dependent on the radial thickness of the outer annular ring such that sorbent flow resistance increases as the radial thickness of the annular ring increases.

Preferably, the RPB comprises one or more axial compensators according to the aspects herein.

Preferably, the RPB comprises one or more sorbent redistribution systems according to the aspects herein.

Preferably, in a plane that includes the axis of rotation of the RPB, the sorbent flow resistance of one or more of the packing materials increases in the direction that gas flows through the RPB.

Preferably, the outer diameter of the RPB is in the range 3 m to 10 m.

Preferably, the inner diameter of the RPB is in the range 0.5 m to 4 m.

Preferably, the first packing material and the second packing material are manufactured from the same material.

Preferably, in use, the sorbent is a sorbent of carbon dioxide gas.

Preferably, in use, the gas that flows into the RPB is a flue gas that comprises carbon dioxide gas.

Preferably, in use, the gas that flows into the RPB is a gas mixture that comprises hydrogen and carbon dioxide.

According to a second aspect of the invention, there is provided a rotating packed bed, RPB, system comprising: one or more RPBs according to the first aspect; a rotatable shaft that comprises the central chamber of each RPB; and one or more conduits within the shaft for suppling sorbent to each central chamber within the rotatable shaft.

Preferably, the inner wall of the second chamber of each RPB is a wall the shaft.

According to a third aspect of the invention, there is provided a rotating packed bed, RPB, system comprising: one or more RPBs according to the first aspect; a stationary shaft that comprises the central chamber of each RPB; and one or more conduits within the stationary shaft for suppling sorbent to each central chamber within the rotatable shaft; wherein each RPB is arranged to rotate about the stationary shaft.

Preferably, the region for mass transfer is spaced apart from the nozzles.

Preferably, the system comprises a plurality of RPBs; the number of RPBs in the range 2 to 10; and in use, gas input into the RPB system is arranged to flow through each of the plurality RPBs.

Preferably, the system comprises one or more vanes between one or more adjacent RPBs; and each vane is configured to reduce rotational/radial components of the gas flow and increase the axial component of the gas flow.

Preferably, the RPB system further comprises: a gas input for receiving a gas; a gas output for outputting the gas; a sorbent input for receiving a liquid sorbent; and a sorbent output for outputting the sorbent.

Preferably, the RPB system, further comprises: a spray system provided at the gas input, wherein, in use, the spray system sprays water into a gas received through the gas input.

Preferably, the gas input is arranged so that, is use, the direction of the flow of gas through the gas input is orthogonal to the axis of the RPB system.

Preferably: the gas input is arranged in a first section of the RPB system; the first section of the RPB system does not comprise an RPB; and in a cross-section that is orthogonal to the axis of the RPB system, the first section is circular such that, in use, the first section causes the gas that flows through the gas input into the first section to rotate.

Preferably, the gas output is arranged so that, in use, the direction of the flow of gas through the gas output is orthogonal to the axis of the RPB system.

Preferably, the gas output is arranged in a second section of the RPB system; and the second section of the RPB system does not comprise an RPB; and in a cross-section that is orthogonal to the axis of the RPB system, the second section is circular such that, in use, gas in the second section rotates.

Preferably, the gas output comprises an inlet pipe; and the inlet pipe is arranged to extend from an inner surface of the second section towards the axis of the RPB system.

Preferably: the RPB system comprises a plurality of RPBs; at least one of the plurality of RPBs is configured such that, in use, sorbent is supplied to the RPB so that the RPB provides a region for mass transfer between gas received by the RPB system and the sorbent; and at least one of the plurality of RPBs is configured such that, in use, water is supplied to the RPB so that the RPB washes gas that passes through the RPB.

Preferably, at least one of the plurality of RPBs is configured such that, in use, liquid is not supplied to the RPB so that the RPB dries and/or demists gas that passes through the RPB.

Preferably, the RPB system further comprises: a liquid collection chamber for collecting liquid that has flowed through an RPB; and a level sensor for measuring the level of the liquid in the liquid collection chamber.

Preferably, each of a plurality of RPBs has a corresponding liquid collection chamber and level sensor for measuring the level of the liquid in the liquid collection chamber.

Preferably, the RPB system further comprises a computing system; wherein, in use, the computing system receives measurements from one or more level sensors, wherein the one or more level sensors each measure the level of a liquid in a liquid collection chamber corresponding to an RPB; and the computing system is arranged to automatically control one or more of the speed of rotation of each RPB, the flow rate of sorbent into each RPB and the flow rate of gas into the RPB system in dependence on the received measurements.

Preferably, the axis of the RPB system is orientated vertically; the gas input is at the bottom of the RPB system; and the gas output is at the top of the RPB system.

Preferably, the axis of the RPB system is orientated horizontally.

According to a fourth aspect of the invention, there is provided a system comprising: a flow splitter for splitting a received flow of gas into a plurality of separate flows of gas; a plurality of RPB systems according to any of the first to third aspects, wherein each of the RPB systems is arranged to receive a different one of the plurality of separate flows of gas; and a flow combiner for combining a plurality of separate gas flows out of each of the plurality of RPB systems.

According to a fifth aspect of the invention, there is provided a sorbent redistribution system of an RPB according to the first aspect.

According to sixth aspect of the invention, there is provided an axial compensator of an RPB according to the first aspect.

According to a seventh aspect of the invention, there is provided a method of transferring mass between a sorbent and a gas by a rotating packed bed, RPB, the method comprising: receiving, by an RPB, a flow of gas; receiving, by the RPB, a flow of sorbent, wherein the sorbent is a liquid; providing a cross-flow of the received sorbent and received gas in a region of mass transfer of the RPB.

LIST OF FIGURES

Figure 2:
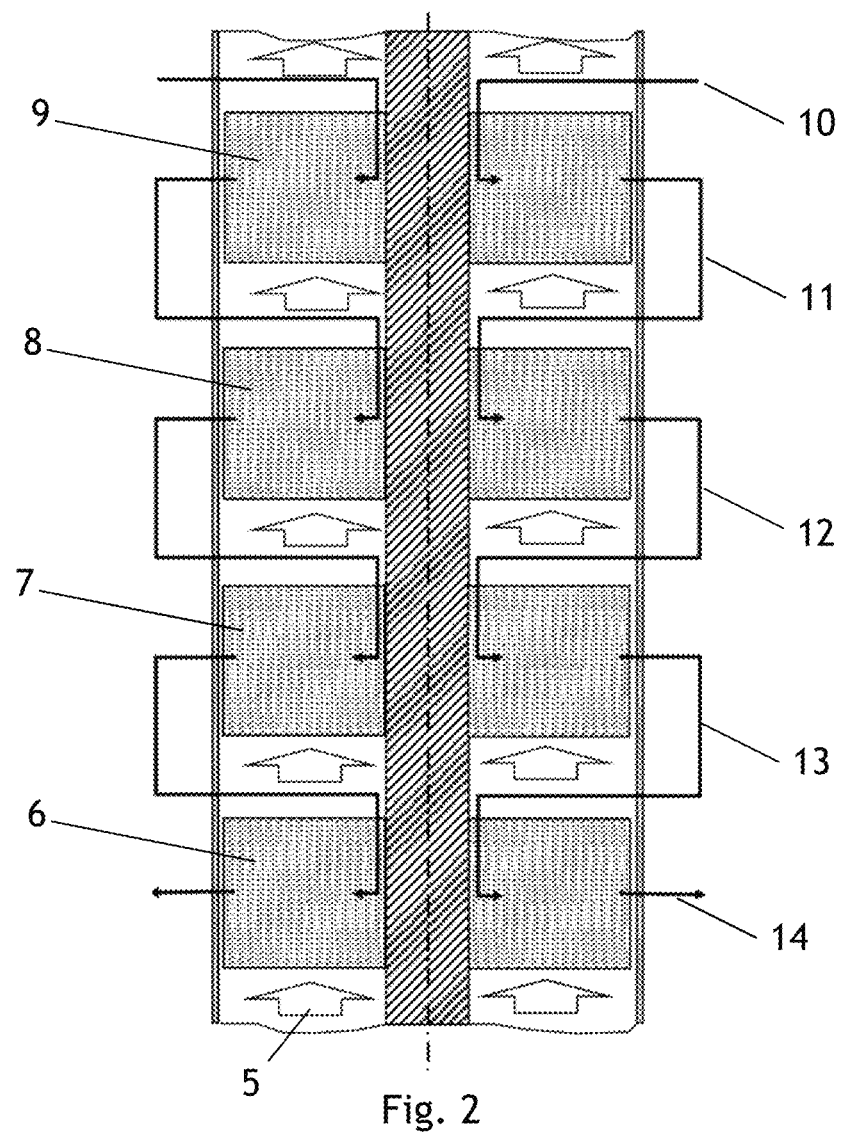
Figure 3:
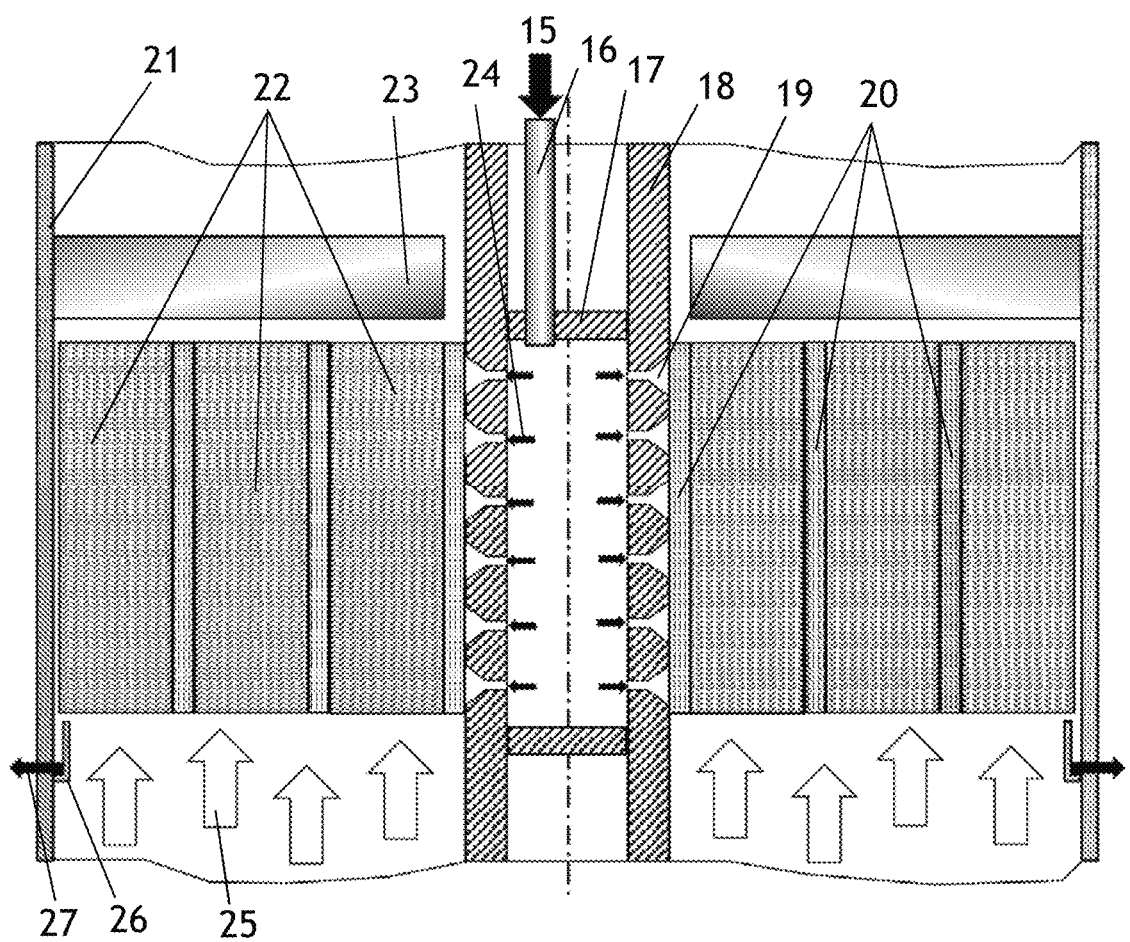
Figure 4:
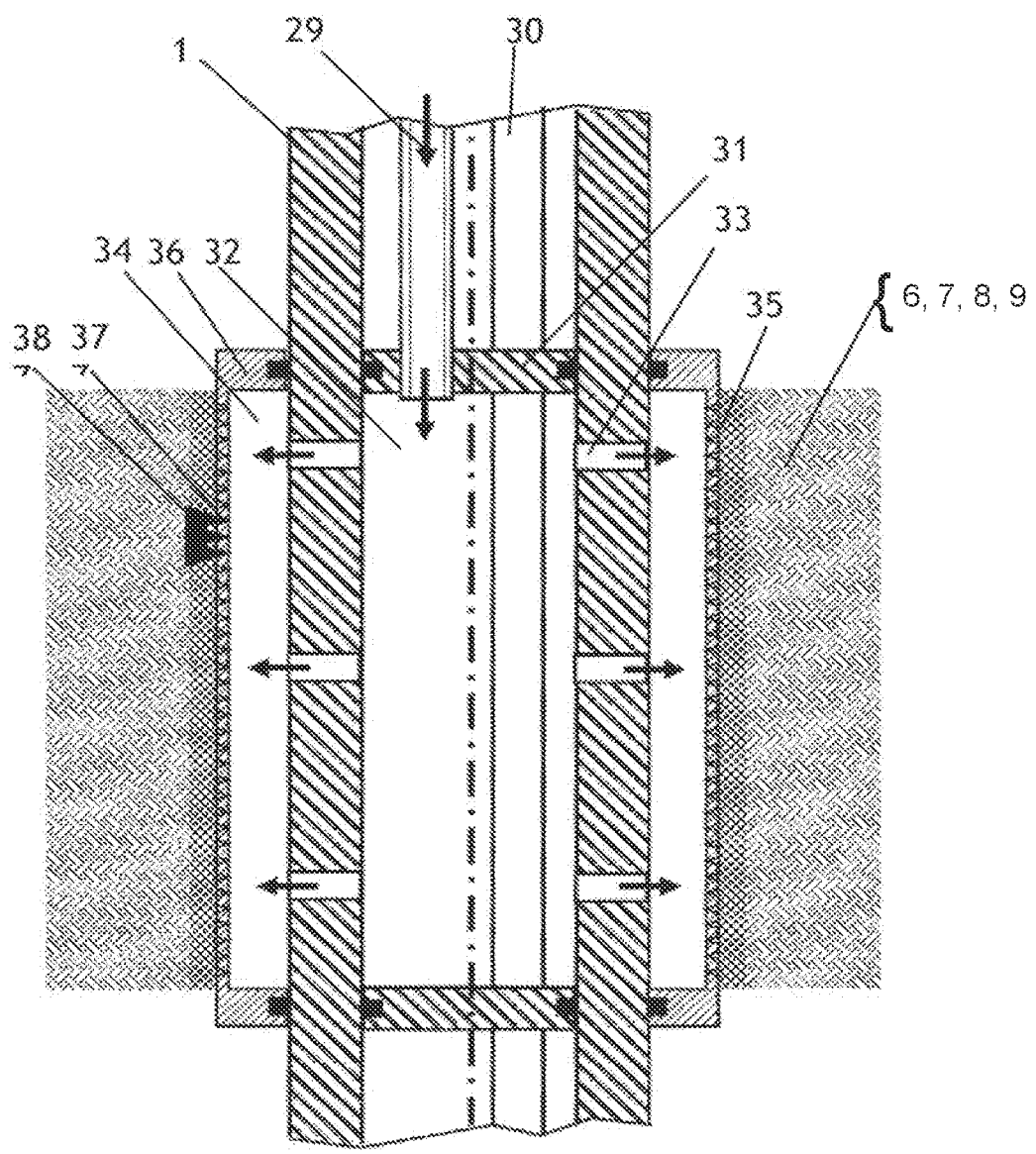
Figure 5:
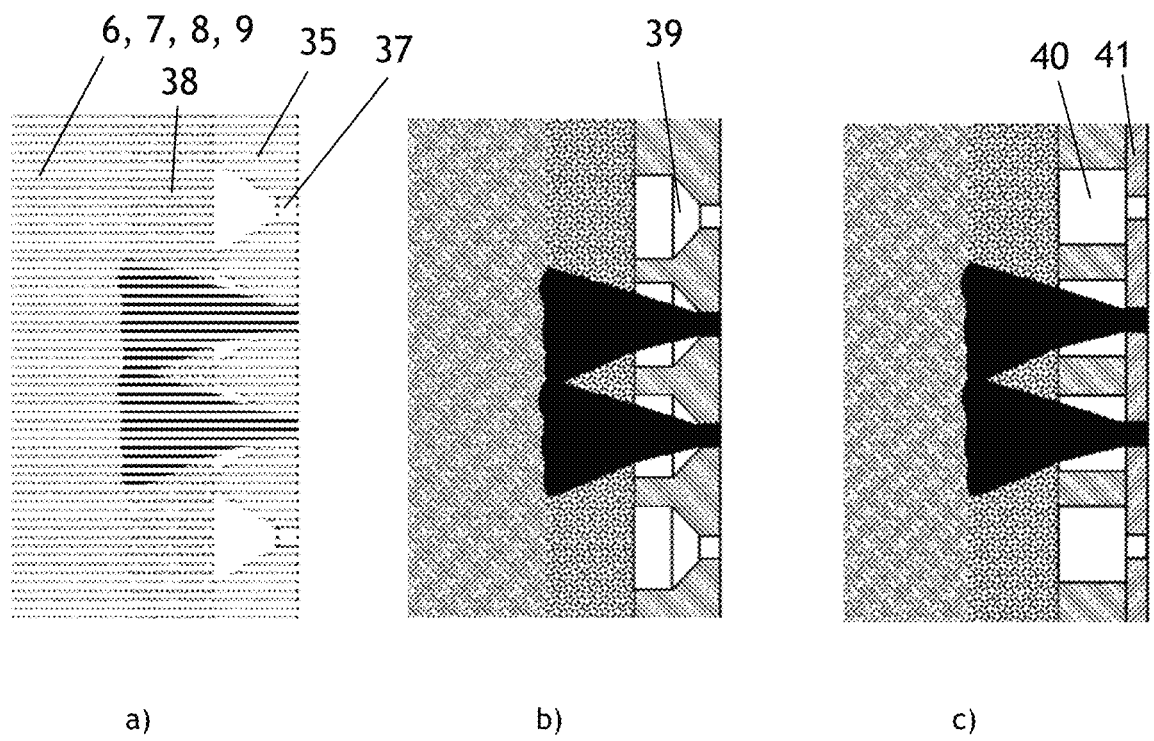
Figure 6:
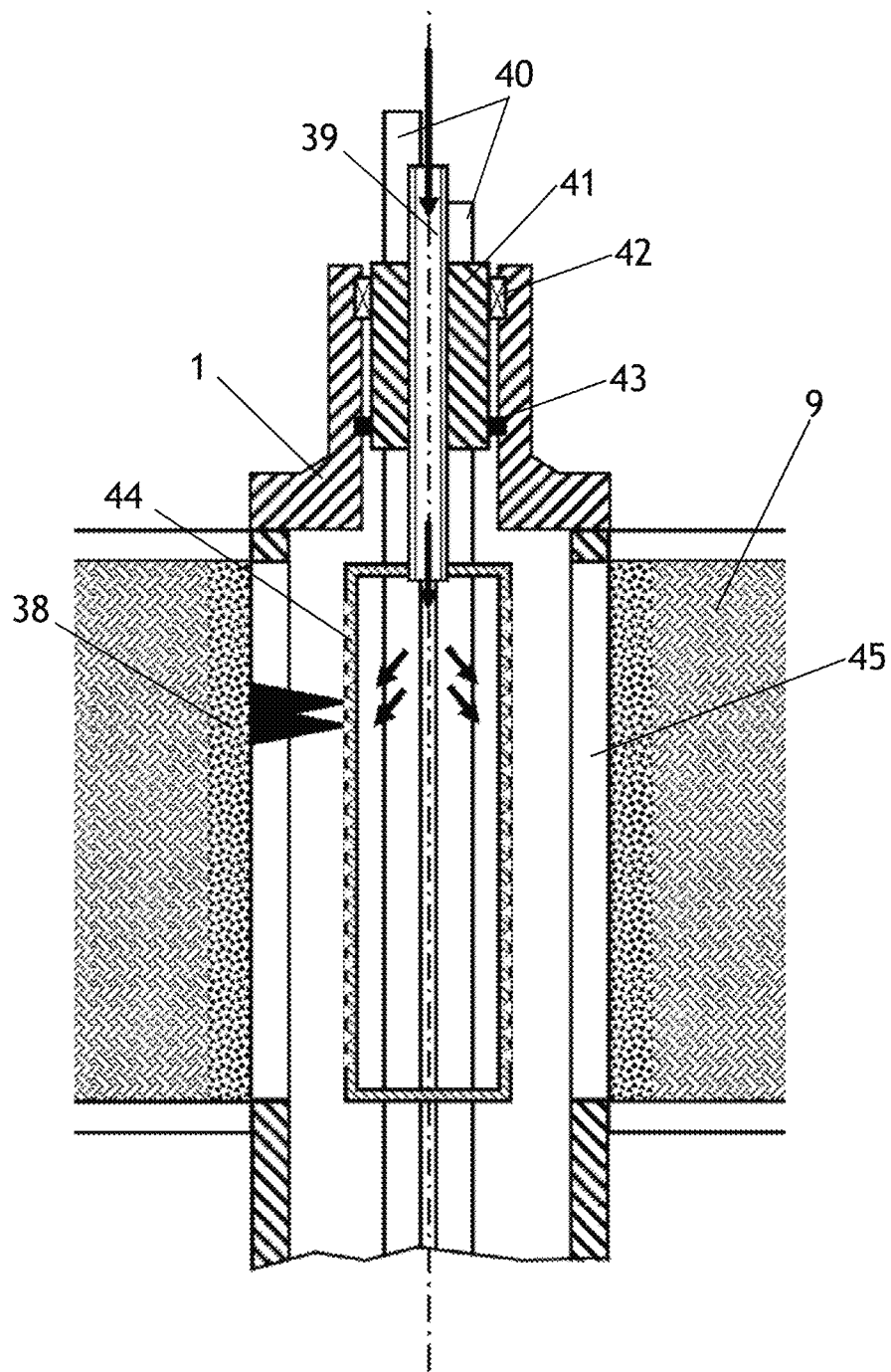
Figure 7:
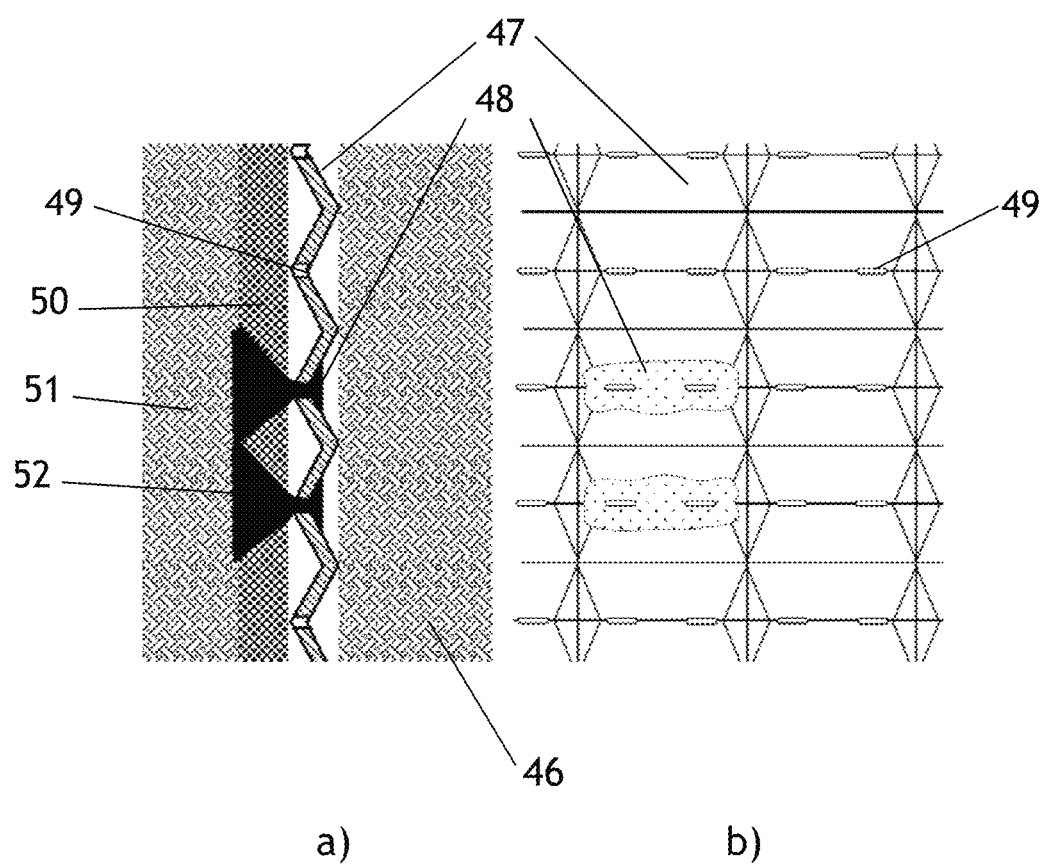
Figure 8:
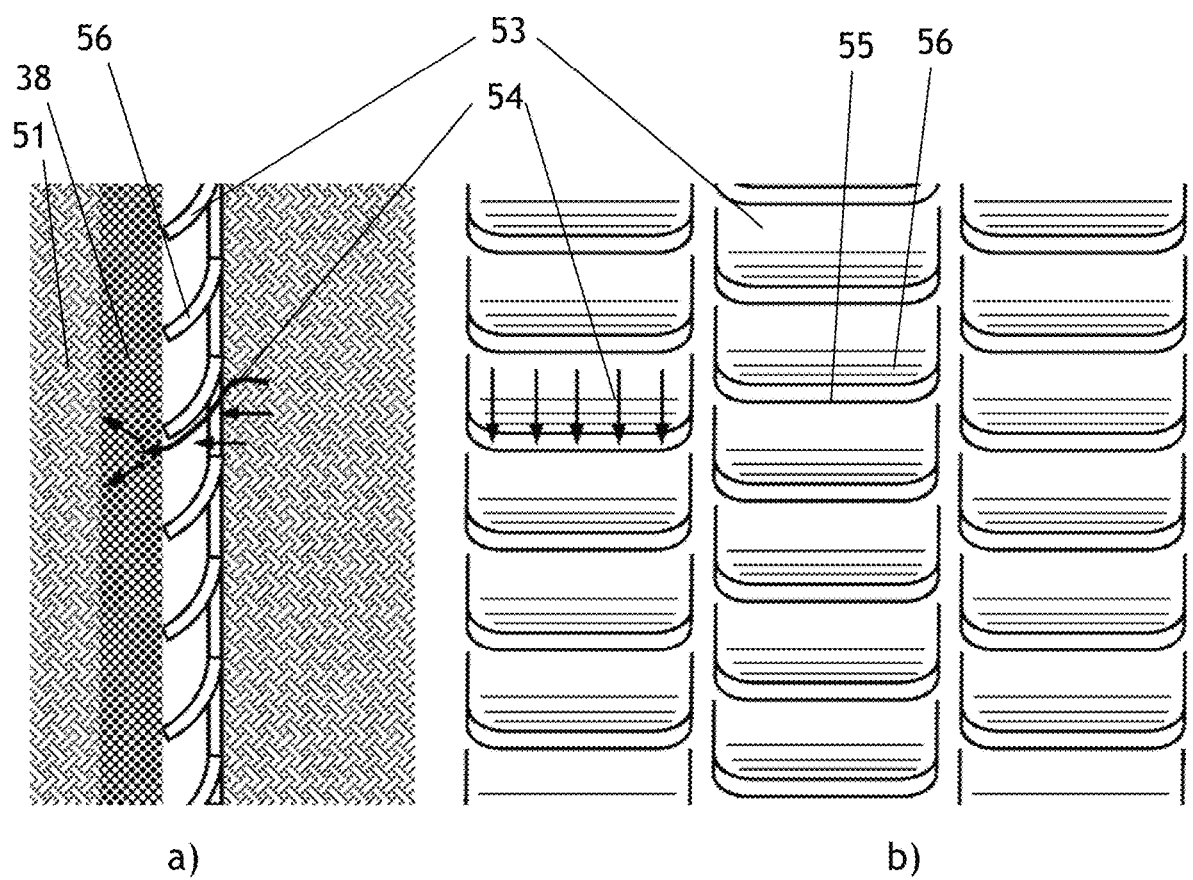
Figure 9:
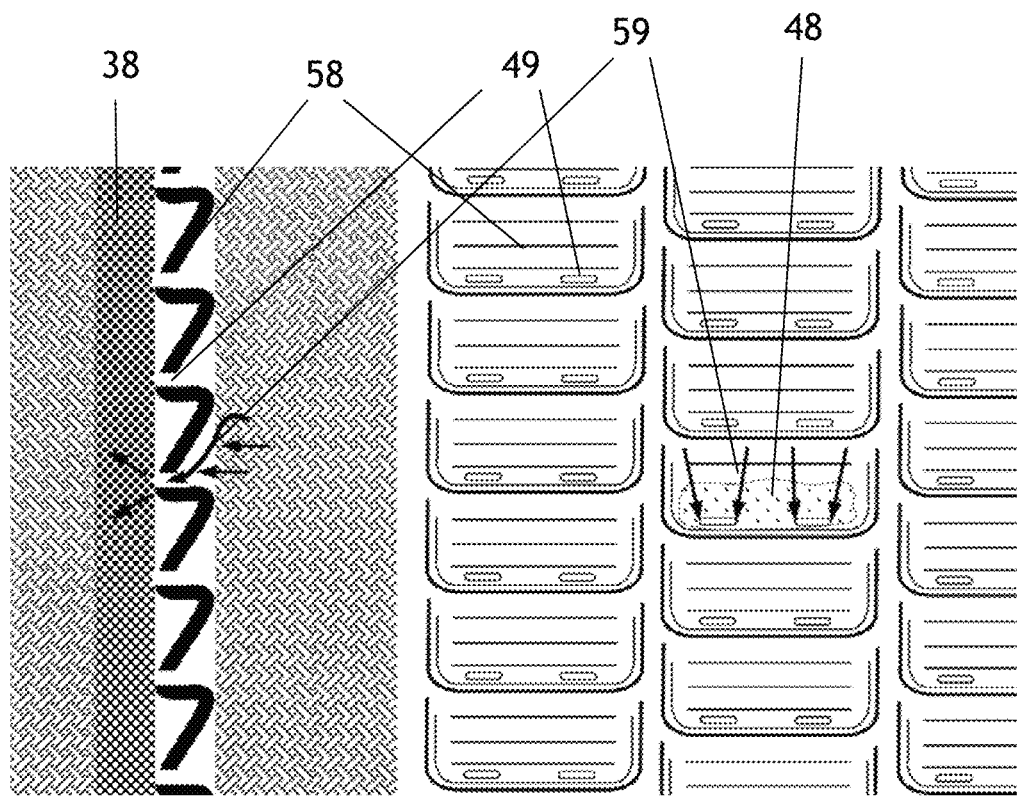
Figure 10:
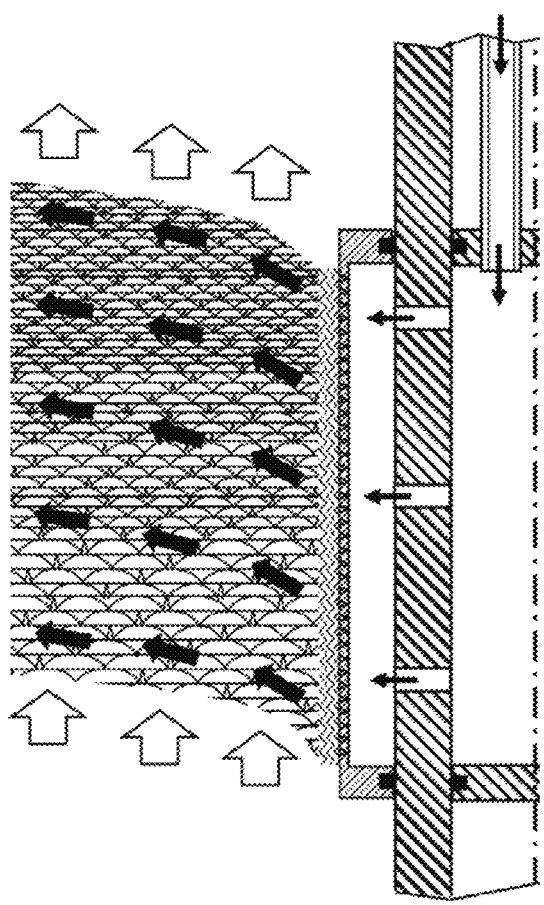
Figure 11:
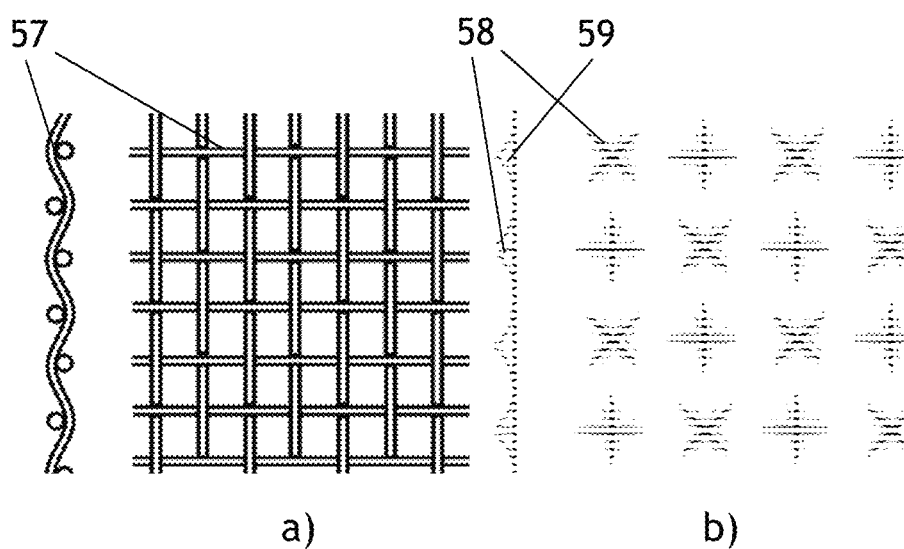
Figure 12:
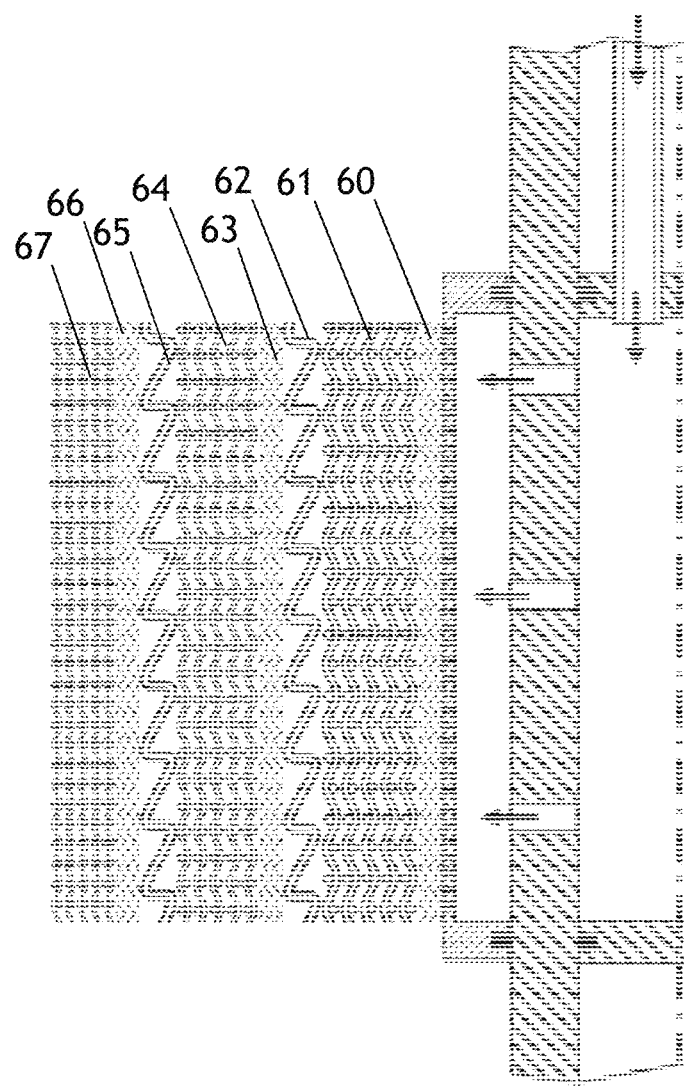
Figure 13:
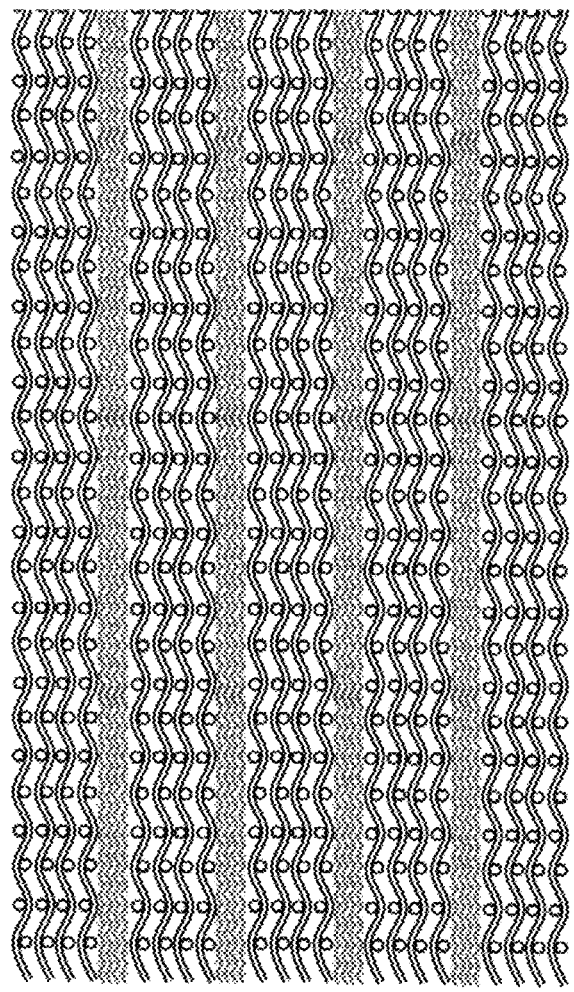
Figure 14:
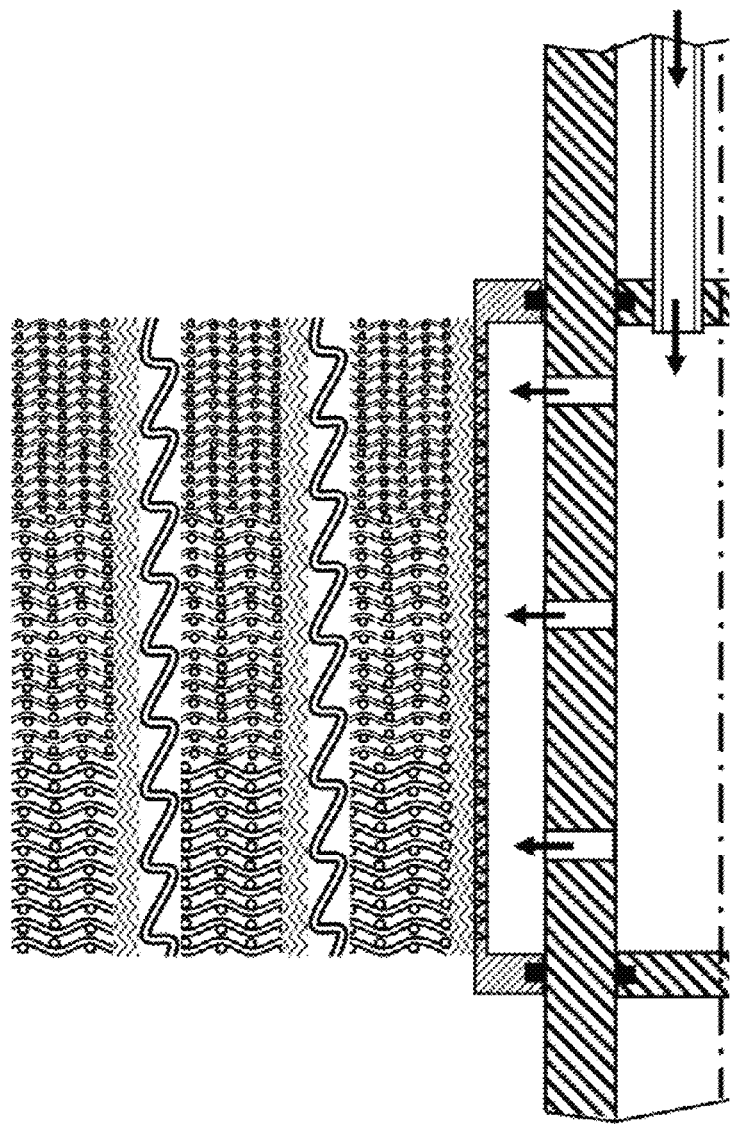
Figure 15:
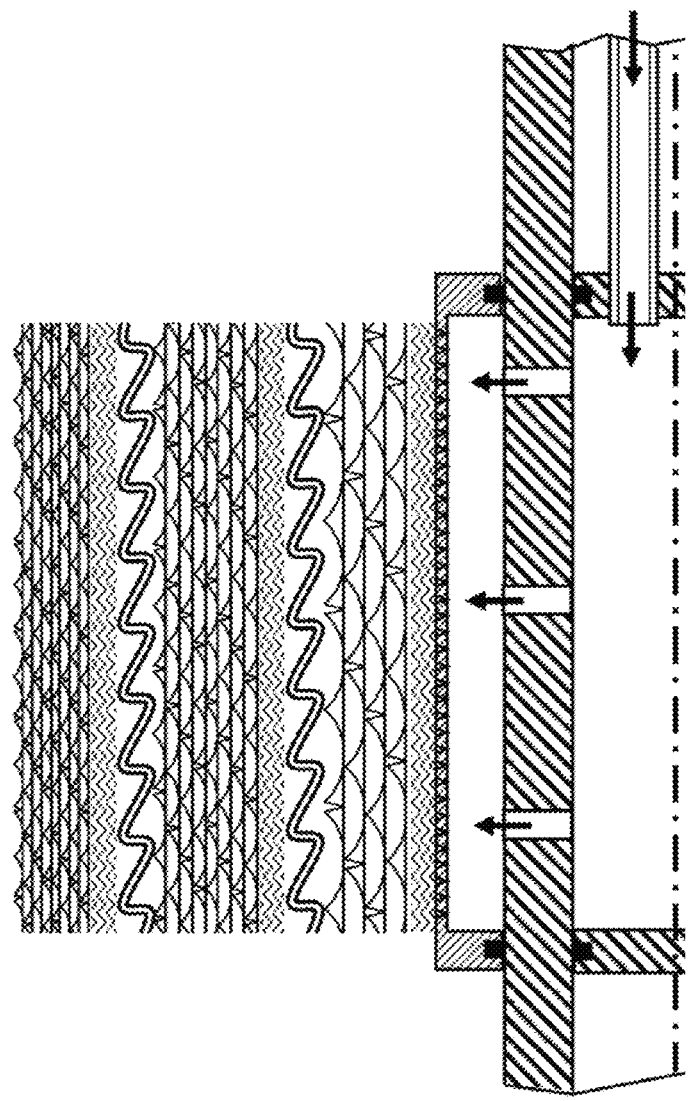
Figure 16:
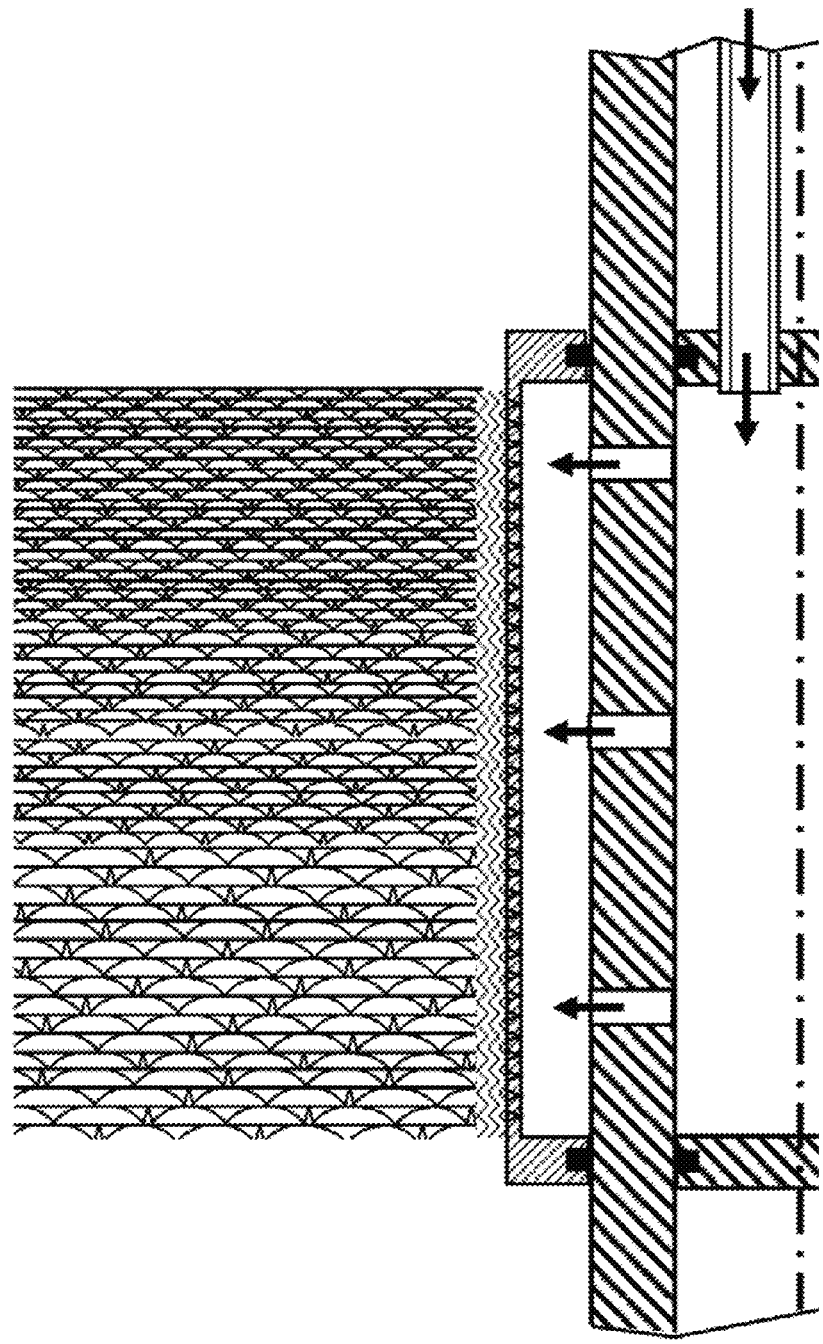
Figure 17:
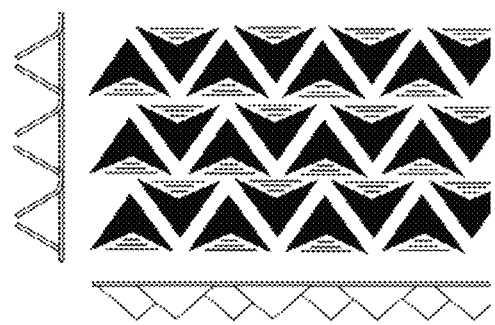
Figure 18:
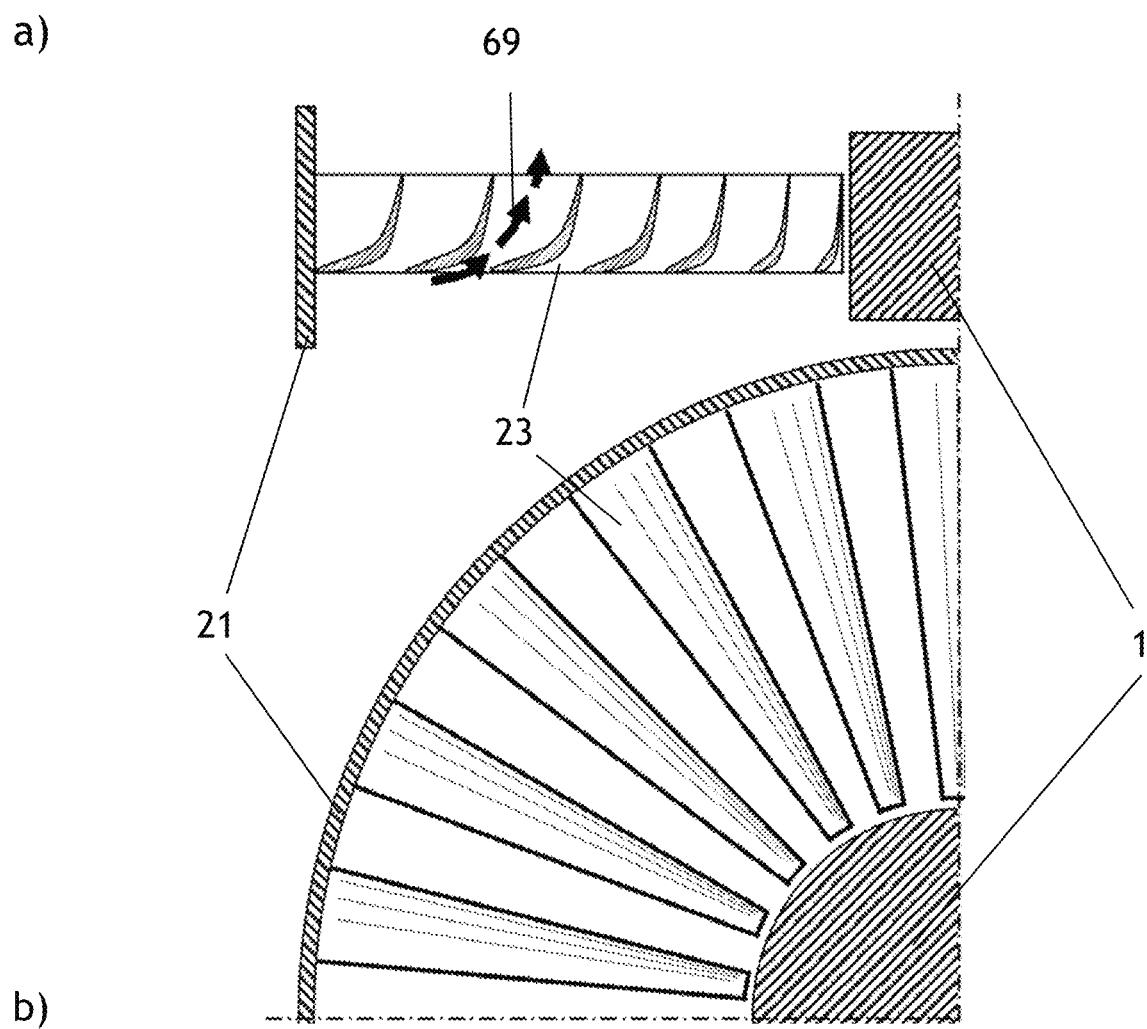
Figure 19:
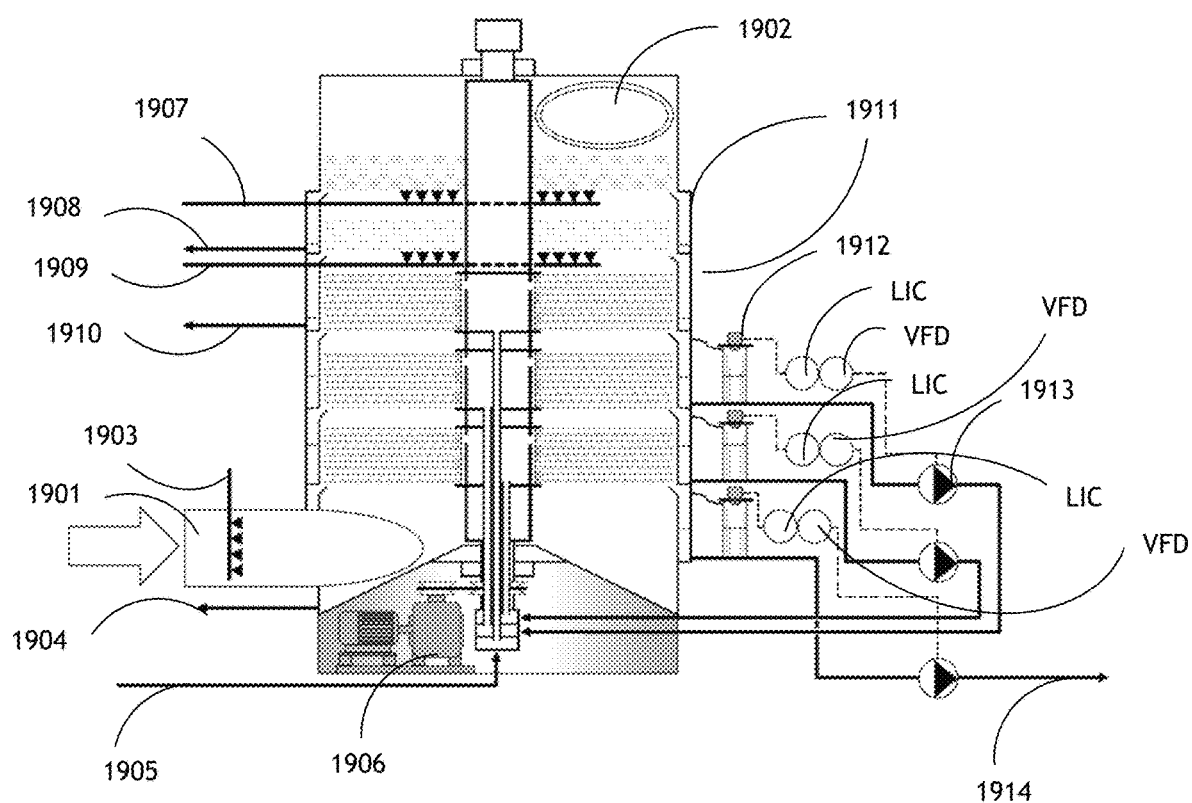
Figure 20:
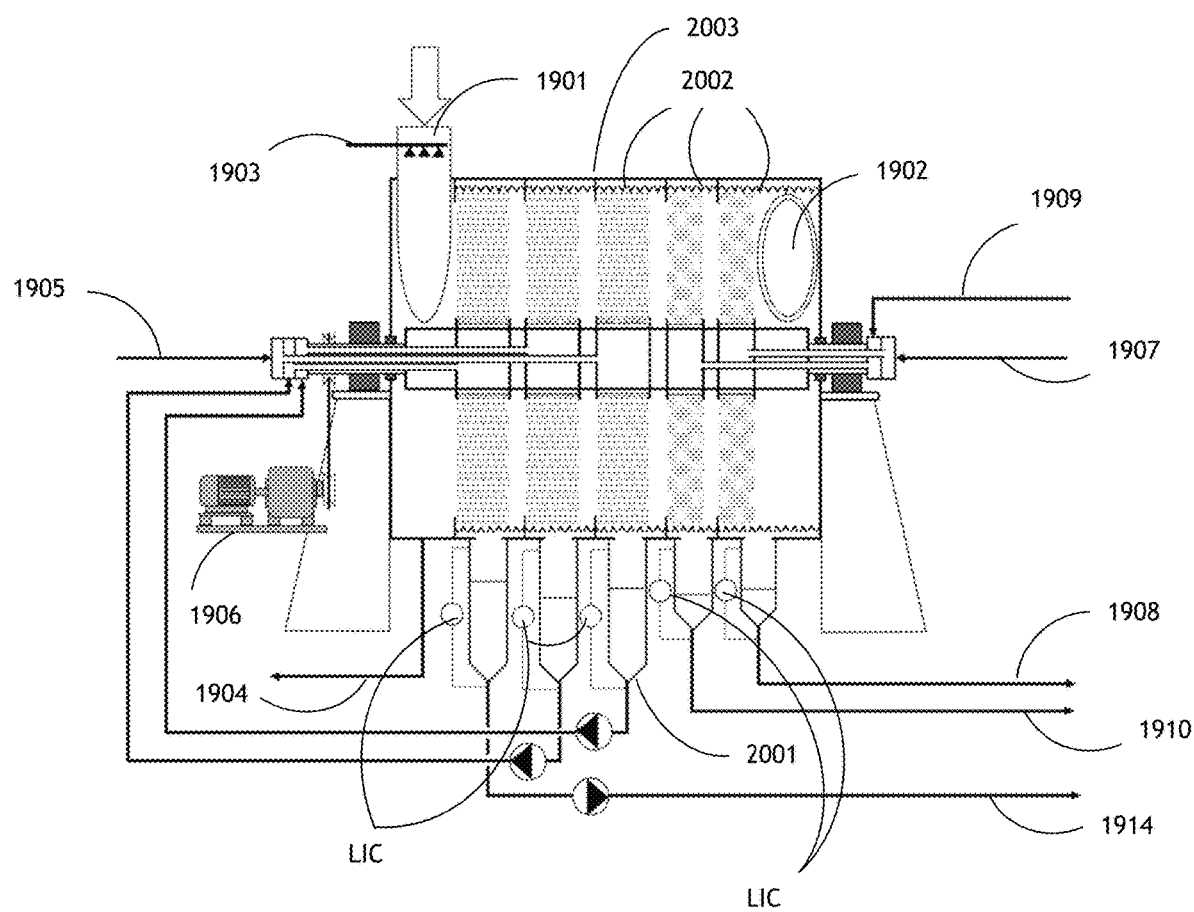
Figure 21:
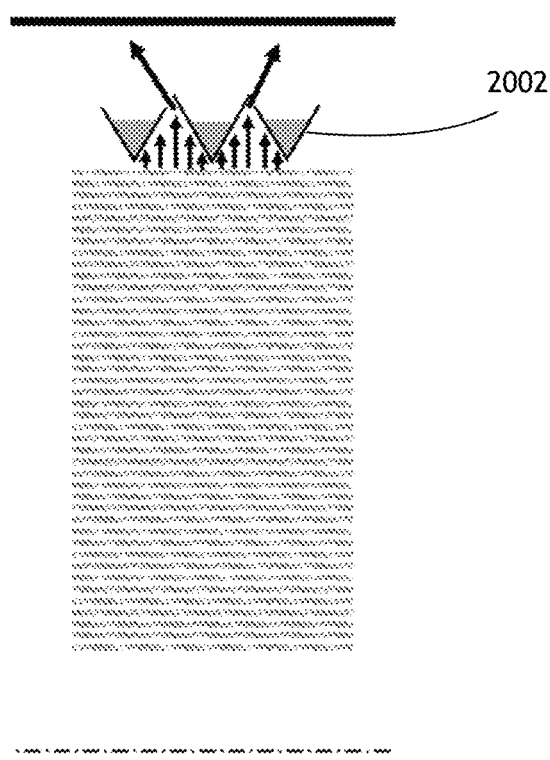

FIG. 1 shows an RPB according to an embodiment;
FIG. 2 shows a plurality of RPBs arranged in series according to an embodiment;
FIG. 3 shows an RPB according to an embodiment;
FIG. 4 shows at least part of an RPB according to an embodiment;
FIGS. 5 a), b) and c) show three different nozzle implementations according to embodiments;
FIG. 6 shows at least part of an RPB according to an embodiment;
FIGS. 7 a) and b) show sorbent redistribution systems in the mass transfer section of an RPB according to an embodiment;
FIGS. 8 a) and b) show an axial compensator according to an embodiment;
FIGS. 9 a) and b) show a flow deflector according to an embodiment;
FIG. 10 shows at least part of an RPB according to an embodiment;
FIGS. 11 a) and b) show packing material according to an embodiment;
FIG. 12 shows part of an RPB according to an embodiment;
FIG. 13 shows an arrangement of packing material according to an embodiment;
FIG. 14 shows at least part of an RPB according to an embodiment;
FIG. 15 shows at least part of an RPB according to an embodiment;
FIG. 16 shows at least part of an RPB according to an embodiment;
FIG. 17 shows an arrangement of packing material according to an embodiment;
FIGS. 18 a) and b) show static vanes for use in an RPB system according to an embodiment.
FIG. 19 shows an implementation of an RPB system according to an embodiment;
FIG. 20 shows an implementation of an RPB system according to an embodiment; and
FIG. 21 shows a design of baffle for use in an RPB system according to an embodiment.

DESCRIPTION

Embodiments of the invention provide a RPB gas capture system in which a gas is captured by a liquid sorbent. A particularly advantageous aspect of embodiments is a new implementation of a rotating packed bed, RPB, that improves on known RPBs for use in gas capture systems. A particularly preferable application of the RPB gas capture system of embodiments is in CCS. Another particularly preferable application of the RPB gas capture system of embodiments is the removal of carbon dioxide from a mixture of carbon dioxide and hydrogen. This is required when hydrogen is produced from natural gas by steam reforming and a water gas shift reaction.

Advantages of embodiments over known gas capture systems include one or more of improved efficiency of mass transfer between the gas and sorbent, higher flow rates through the gas capture system and a lower required mass and/or volume of the gas capture system. The RPB according to embodiments allows operation at very high gas flow velocities and correspondingly high liquid flow rates. This results in very intensified conditions and thereby high mass transfer rates. Increased gas flow velocity allows a reduction of the cross sectional area of the RPB, and increased mass transfer rates allows reduction of the RPB length/height. There is therefore a significant reduction in the equipment size and weight. Equipment size and weight is of crucial importance for implementation of $CO_2$ capture on offshore installations, and is also an important factor when considering retrofitting $CO_2$ capture plants to existing installations in other applications.

In the embodiments described below, a flue gas comprising $CO_2$ is cleaned by having at least some of the $CO_2$ captured by a liquid sorbent. However, embodiments include the same system and techniques being used to capture any other gas by a liquid sorbent. For example, the sorbent may be a sorbent of $H_2S$ or $SO_2$. The gas mixture that is cleaned by embodiments is also not restricted to being a flue gas and may, for example, be sour gas.

The gas mixture may alternatively be a mixture of carbon dioxide and hydrogen with embodiments cleaning the gas mixture by reducing the concentration of carbon dioxide in the gas mixture.

There are a number of sources of dirty gas. The dirty gas may be flue gas, such as exhaust gas from gas turbines, diesel engines, any of gas, oil, coal, waste or biofuel fired boilers. Flue gas from natural gas fired gas turbines typically has 3.5-4% vol $CO_2$. Flue gas from a coal fired boiler typically 13-14% vol $CO_2$. The dirty gas may alternatively be natural gas. The gas capture system can be used in a number of industries, such as the power generation industry, the metal production industry, cement production industry and mineral processing industry.

The sorbent may be any of a number of known and commercially available liquid sorbents. For example, the substantial component of the sorbent may be monoethanolamine, MEA. The sorbent may also comprise a mixture of different sorbents with each of the mixed sorbents being a sorbent for a different gas. The gas capture system can therefore capture a plurality of different gasses from the gas being cleaned.

Embodiments of the invention are particularly advantageous in the application of cleaning flue gas that is substantially at atmospheric pressure and a relatively low $CO_2$ concentration, such as flue gas from a gas turbine.

Embodiments provide a cross-flow RPB, CF-RPB. In a CF-RPB, the flow of the gas through the RPB is orthogonal to the flow of the sorbent in the mass transfer region of the RPB. The sorbent flow is substantially radially outwards from the centre of an RPB whereas the gas flow is substantially parallel to the axis of the RPB. Although embodiments provide CF-RPBs, the CF-RPBs of embodiments are referred to as RPBs throughout the present document.

The known RPB disclosed in EP0020055A1 is an in-line RPB, and not a cross-flow RPB, as the relative flows of the gas and sorbent are in-line with each other. In addition, there is no disclosure in EP0020055A1 of using an RPB in CCS applications.

A cross-flow RPB has a number of advantages over an in-line RPB. These include, increased efficiency and easier design.

FIG. 1 shows a cross-flow rotating packed bed, CF-RPB, according to an embodiment. The RPB comprises rotating shaft (1) with a packed bed (2) installed inside a channel (3). When viewed along the axis of the shaft, the packed bed (2) is annular and the channel (3) is circular. The packed bed (2) is porous so that both a liquid sorbent and a gas can flow through it. In use, the sorbent is input onto the inner perimeter of the packed bed (2) whilst the packed bed (2) is rotating. The flow path (4) of the sorbent is mainly radially outwards due to the centrifugal force caused by the rotation of the packed bed (2). Flue gas (5) flows through the circular channel and passes through the RPB substantially in an axial direction that is perpendicular to the radial flow of the liquid. Embodiments include the RPB being orientated with the longitudinal axis of the RPB being vertical, as shown in FIG. 1, or with the longitudinal axis horizontal. When the longitudinal axis is orientated vertically, the gas flow direction through the RPB may be either upwards or downwards.

In order to achieve efficient mass transfer between the gas and the sorbent, it is desired for the sorbent to form a thin liquid film over the large surface area provided by the porous packed bed (2) and also for droplets of the sorbent to form in the voids of the packed bed (2) where gas flows. This creates a large liquid surface area for mass transfer of $CO_2$ from a gas phase to a liquid phase in which it is absorbed/adsorbed, by the sorbent. When the RPB system is operating under steady state conditions, the concentration of $CO_2$ in gas phase and liquid phase, i.e. sorbent, within the packed bed (2) varies in both the axial direction and the radial direction.

The effectiveness of the capture of the $CO_2$ by the sorbent is dependent on all of the speed at which the packed bed (2) is rotated, the rate at which the liquid sorbent flows into the packed bed and the rate at which gas flows through the system. When the sorbent flow rate and rotational speed are appropriate for a particular mass flow rate, the mass transfer rate is orders of magnitude higher than in a conventional gravitational based gas capture system in which a rotating packed bed is not used.

Although a single large RPB may be able to capture 80-90% of the $CO_2$ from a flue gas stream, it is more efficient for the gas capture system to comprise a plurality of smaller RPBs arranged in series with each other. FIG. 2 shows an implementation of a gas capture system according to an embodiment with a plurality of RPBs arranged in series. In FIG. 2, four RPB stages are shown however embodiments include there being any number of RPBs. In use, the flue gas (5) passes through all of RPB stage one (6), RPB stage two (7), RPB stage three (8) and RPB stage four (9), whereas the liquid sorbent (10) passes through the RPB stages in the opposite order, i.e. RPB stage four (9), RPB stage three (8), RPB stage two (7) and RPB stage one (6). Sorbent from one stage is re-introduced at the inner perimeter of the stage below. The configuration advantageously has a high driving force for mass transfer all over the packing. In addition, with a multistage configuration with re-introduction of the absorbent between the stages, it is also possible to include systems for intermediate cooling of the sorbent and/or flue gas between the stages as well as recirculation of chilled sorbent over each stage. The system can also be operated flexibly so that it the gas capture system is adaptable for efficient operation with different flue gas compositions, gas flow rates and sorbents.

The RPBs according to embodiments comprise a number of features for providing advantageous performance.

The CF-RPBs according to embodiments comprise one or more features for improving the utilisation of the mass transfer volume within each RBP in order to provide more efficient mass transfer than known gas capture systems. The goal is to ensure that all surfaces within the mass transfer volume of each RPB are wetted with liquid sorbent and that the wetted surfaces are renewed in order to maintain an appropriate flow of sorbent for the mass transfer. The cross flow gas stream is preferably able to access all areas within the packing so that there is an appropriate supply of $CO_2$ rich gas to the wetted surfaces.

To achieve the above, each RPB according to embodiments is preferably designed and operated such that within the packing where mass transfer occurs, there is very little, or substantially no, flow of the sorbent in the axial direction. The flow of the sorbent is substantially radial and substantially uniformly distributed tangentially.

The ratio between outer radius and inner radius of the RPB may be 2 to 4. The flux density of the liquid sorbent will drop by a corresponding factor and the centrifugal force will increase with a corresponding factor as the liquid sorbent flows from the inner surface to the outer perimeter of the RPB.

As a consequence of this:
It is preferable to install means for redistribution of the liquid at certain radial distances to avoid dry zones of the packing;
The packing properties, such as porosity, specific surface area and spherical equivalent particle diameter, may vary in the radial and/or axial directions; and
The packing properties are preferably anisotropic so that there is a higher flow resistance for the liquid in a radial direction than for the gas in an axial direction.

Accordingly, the CF-RPB is preferably designed and operated so that:
Liquid sorbent is uniformly distributed tangentially at the inner perimeter of the RPB;
Liquid sorbent is appropriately distributed axially at the inner perimeter of the RPB in accordance with an appropriate profile;
Liquid sorbent is not substantially deflected in axial direction as it moves in the radial-tangential plane by the cross flowing gas and/or due to gravity;
Liquid sorbent spreads out evenly in the packing in the tangential direction as the radius and the centrifugal force increase;
Radial gas flow rate in accordance with the specific radial profile is achieved by variable flow resistance in the RPB; and
Radial gas flow control is achieved by balancing the simultaneous influence of pressure gradients due to the porosity of the packing, the liquid loading of the packing, and inertial forces from the rotational movement of the RPB.

Other preferable features of embodiments include:
Use of stationary vanes above each RPB for conversion of rotational energy to static pressure in the flue gas
Multi stage configuration of CF-RPB for simulation of counter flow packed column
Use of intercooling between stages in multi stage configuration to optimize temperature profile in absorber system
Use of reflux of absorbent over individual CF-RPBs to increase liquid loading for optimised liquid renewal rate
Configurable system for distribution of liquid to packing
System for efficient removal of liquid from outer casing FIG. 3 shows an embodiment of one of the RPBs as shown in FIGS. 1 and 2 in more detail. The RPB has an inlet (15) for receiving the sorbent, an arrangement (16), (17) for feeding the sorbent to nozzles (19), a concentric rotating shaft (18) that provides support and rotation to the CF-RPB, nozzles (19) for evenly distributing the sorbent (24) into the packing (22), flow adjustment sections (20) in the RPB for providing a substantially uniform distribution of the sorbent at all axial and/or tangential positions in the RPB, outer casing (21) for mechanical integrity and for directing the flue gas (25) flow through the RPB, packing (22) for providing surfaces and regions for mass transfer, static vanes (23) above the RPB for recovering the rotational energy that the flue gas gains when passing through the RPB, liquid collection tray (26) for collecting sorbent leaving the RPB at the outer perimeter of the packing (22) and sorbent outlet (27).

An RPB according to an embodiment does not need to comprise all of the features shown in FIG. 3 and may comprise further features to those shown in FIG. 3. For example, the RPB may not comprise the static vanes (23). As another example, there may be one or more metal bars, not shown in FIG. 3, that are provided radially along what are each of the upper and lower surfaces of the packing when the axis of the RPB is aligned vertically. These help to support the structure of the packing so that the packing is retains its shape.

Features of the RPB for providing one or more of the above-identified advantages are described in detail below.

A problem that may occur in an RPB is that the distribution of a liquid sorbent within the packing is not uniform and an initial non-uniform distribution lingers. When the liquid sorbent is flowing radially through a packing and there is gas flow along the axis of the RPB, so that the gas and liquid are in cross-flow, a non-uniform distribution of the sorbent in the packing results in some of the gas travelling through the RPB without contacting the sorbent.

Described below are techniques according to embodiments for solving the above problem by supplying liquid sorbent through a rotating shaft and distributing the sorbent smoothly, i.e. evenly/uniformly, on the inner perimeter of the mass transfer region of a rotating packed bed.

A smooth/even/uniform distribution, in the present context, means that there is substantially no variation of the mass fluxes of gas and liquid over a few, i.e. 2 to 10, adjacent characteristic structural elements of the packing. It is preferable for there to be a uniform distribution of sorbent and gas as the efficiency of the CF-RPB is decreased by dry areas being present within the packing where there is no sorbent.

FIG. 4 shows a single RPB according to an embodiment. Each of the multiple RPB sections (6), (7), (8) and (9) of the RPB system shown in FIG. 2 can be separately supplied with liquid sorbent though individual pipes, i.e. conduits, (29) and (30) installed in the centre of the main loadbearing rotating shaft (1). Baffle plates (31) seal a compartment (32) within the hollow shaft (1). Each of the RPBs in the RPB system has a compartment (32). Each compartment (32) is a central chamber within an RPB to which sorbent for use in that specific RPB is supplied though a pipe (29). Pipe (30) is one of a plurality of pipes shown passing through a compartment (32) on its way to a respective section that that pipe is arranged deliver sorbent to. From compartment (32), sorbent is distributed through a number of ports (33) in shaft (1) to a ring volume (34). Ring volume (34) is enclosed by a perforated pipe (35) with internal flanges (36) fixed to shaft (1).

The same sorbent may be applied to each RPB or there may be differences in the sorbents applied to each RPB. For example, a different type of the same sorbent may be applied to each RPB with the types of sorbent having different gas capture properties. A sorbent of a first gas may be applied to one of the RPBs and a sorbent of a second gas, that is different from the first gas, may be applied to another of the RPBs. One or more of the RPBs may have, for example, water instead of sorbent supplied to it and/or there may be one or more RPBs with no liquid supplied to them.

The system is dimensioned with sufficient flow volume to secure even pressure of liquid in ring volume (34). The perforation (37) in pipe (35) is shown in any of FIG. 5 a), b) or c). The perforation is preferably a large number of nozzles, that may be partially conical holes, that act as a spray of the sorbent. The effect of the nozzles may be that the sorbent will already have spread out conically before hitting the inner distribution layer of the packing (38). The inner distribution layer is a porous layer with very small pore size so that it has a high flow resistance for the sorbent. Due to the high flow resistance, the sorbent will smooth out in the tangential and axial direction before entering the mass transfer section of the packing (6), (7), (8), (9). The inner distribution layer may be, for example, 5 mm to 10 mm thick in a radial direction.

The ring volume (34) can be considered to be a second chamber. The inner distribution layer of the packing (38) can be considered to be a first packing material. The mass transfer section can be considered to be a second packing material. The first and second packing materials may be the same material but, for example, part of the material may be compressed/crushed to increase its flow resistance to sorbent.

The fluid pressure is preferably maintained at a low level from the outlet of the pipe (29) to the entrance of the outlet of the ring volume (34) through the perforation (37). This ensures that the main fluid pressure drop is across the perforation (37), e.g. nozzles, and assists the fluid distribution by the perforation (37).

The central chamber, second chamber, first packing material and second packing material are configured such that, in a cross section of the RPB when viewed along the axis of the shaft: the central chamber is circular and the second chamber, first packing material and second packing material are annular. In the cross section: the central chamber, second chamber, first packing material and second packing material are concentric; and the second packing material encloses the first packing material, the first packing material encloses the second chamber and the second chamber encloses the central chamber.

Embodiments also include alternative implementations to what is shown in FIG. 4. For example, the ports (33) between the compartment (32) and the ring volume (34) may all be arranged in the same plane, with the plane being orthogonal to the axis of the RPB. For example, the RPB as shown in FIG. 4 may only have highest horizontal level of the shown ports (33) and not the two other horizontal levels of ports (33). Advantageously, this implementation reduces the likelihood of an air lock occurring in the compartment (32). Another alternative implementation that is included by embodiments is the sorbent supply pipe (29) to the compartment (32) being fed into the compartment from the opposite end of the compartment (32) from that shown in FIG. 4. That is to say, when the axis of the RPB is vertically aligned, the sorbent flows vertically upwards through the pipe (29) into the compartment (32) and then out of the open end of the pipe (29). The pipe (29) may extend into the compartment (32) so that the open end of the pipe (29) is close to the top of the compartment (32).

FIGS. 5 a), b) and c) show three different nozzle implementations according to embodiments that may ensure that the liquid enters the mass transfer packing of the RPB smoothly distributed axially and tangentially. It is preferable to use small diameter of the inner hole (37) to secure much higher pressure drop in the nozzles (37) than in the ports (33) and in the ring volume (34). This may ensure a substantially even flow of sorbent to all nozzles (37).

As an alternative to a cylindrical/conical shape, the nozzles (37) can be step drilled with an inner hole and an outer hole, the outer hole having a larger diameter than the inner hole and there being a conical section (39) between the inner and outer holes.

A way of constructing the outer wall of the ring volume (34), i.e. the second chamber, according to an embodiment is to use a fairly rigid pipe with a pipe wall thickness of 3-10 mm. When perforation (40) is formed as shown in FIG. 5 c), the perforation comprises a first cylinder and a second cylinder with the first cylinder having a larger diameter than the second cylinder. The diameter of the first cylinder may in the range of 2-10 mm and is preferably in the range 3-4 mm. The diameter of the second cylinder, which may be formed by a laser, may be in the range of 0.1-5 mm and is preferably in the range 0.4-0.6 mm. The first and second cylinders may be formed in the same pipe wall. Alternatively, only the first cylinder may be formed in the pipe wall and the second cylinder may be provided by a separate perforated sheet metal layer (41), as shown in FIG. 5 c).

An alternative design of pipe (35) according to an embodiment is a ring shaped wedge wire screen with the small slots facing the liquid entrance side. Such components may be known for various filtration purposes in the waste water treatment industry but not for use in gas capture technologies.

The inner hole (37) may have a diameter in the order of 100-1000 micron, and the wall thickness of pipe (35) may be in the order of 3-10 mm. Using holes in a triangular pattern and a pitch between holes of 1-1.5 times largest diameter of holes the sorbent may be uniformly distributed when it hits the distribution screen (38) such that the variation in amount of sorbent that contacts each part of the screen (38) is not substantial. Conical holes may have smallest pitch because there is still enough solid material left to secure the required mechanical strength of pipe (35). About 5-10 mm thickness of dense porous material, for example a multilayer wrapping of fine wire mesh (wire diameter in the order of 20-200 micron and pitch between wires 2-3 wire diameters) may secure substantially uniform distribution when operating in a regime of 10-100 G centrifugal force. Also moulded metal foam or other similar non wrapped materials may be used. The wire mesh may be a Retimet™ material, such as Retimet™80 (see http://nearyou.imeche.org/docs/defautsource/Staffordshire-Area/metal-foams-in-aerospace.pdf?sfvrsn=0 as viewed on 14 Sep. 2017).

In an alternative embodiment, the pipe (35) and distribution layer (38) are separated so that the spray cone grows in diameter before hitting the layer (38). The separation can, for example, be provided by some layers of very open wire mesh wrapped around pipe (35). Open in this context may mean a wire mesh with a pitch between wires of 5-10 wire diameters or more.

Embodiments also include the same combined effect of the nozzles (37) and the distribution layer (38) being achieved by manufacturing a single element using modern rapid prototyping techniques. Ring shaped elements provide the inner nozzle effect, then openings the allow spray to spread out are provided followed by a dense porous zone. These may be manufactured as single elements and then stacked to make up the required axial length of (35) and (38).

FIG. 6 shows another embodiment in which a liquid sorbent is supplied from a stationary central chamber mounted inside a rotating RPB.

FIG. 6 shows an alternative way to secure smooth distribution of absorbent liquid on the inner perimeter of the mass transfer packing (9), i.e. second packing material, of the RPB. The assembly of liquid supply pipe (39), pipe support hubs (41) and distribution cylinders (44) are now installed stationary inside a rotating assembly and are supported on roller bearings (42) on the inside of the rotating shaft(s) (1). The assembly is fixed to outside structure and is therefore prevented from rotating. Seals (43) prevent ingress of bearing lubrication oil to the central ring volume or absorbent liquid out to the bearing. Inside the rotating packed bed (9), the distribution cylinder (44) has nozzles drilled all around its cylindrical surface. The nozzles secure even distribution of absorbent to the inner surface of the distribution layer (38). Since the inner surface of (38) rotates at high speed, liquid is easily distributed in a tangential direction.

The support bars (45) act as the central core and distribution layer (38) may be made from a multilayer wrapped wire screen. Core (45) can be constructed from slim flat bars a few mm thickness with the wide side in radial direction in distance 20-50 mm in tangential direction. The distribution layer (38) may ensure even distribution into the mass transfer region despite the presence of the support bars.

Embodiments also include using a tube made from a porous media like a structural foam or sintered material as distribution layer (38). In this embodiment, support core (45) may not be provided.

An advantage of RPB as shown in FIG. 6 over that in FIG. 4 is that the number of distribution nozzles in cylinder (44) can be one to two orders of magnitude lower because the radial distance for the spray is much larger and in the order of centimeters to decimeters. This means that the minimum diameter of each nozzle can be larger and with a correspondingly larger flowrate and pressure drop, and the risk of clogging by particles present in the sorbent is also much lower. The distribution layer can also be made with a larger pore diameter. This can advantageously reduce the need to service the RPB system.

A problem experienced by known designs of RPB is that the liquid sorbent can form into fluid streams. Such streaming causes most of the sorbent to only flow in the streams and the flow of sorbent is not evenly distributed in the mass transfer region of the RPB.

FIGS. 7 a) and 7 b) show an embodiment that solves the above problem by providing one or more sorbent redistribution systems in the mass transfer section of the RPB.

FIGS. 7 a) and 7 b) show one of one or more sorbent redistribution systems that are provided in the RPB. Each sorbent redistribution system, also referred to as a redistribution section (20), is parallel to and radially spaced from the central axis of the RPB. The sorbent in the inner mass transfer packing (46) is under the simultaneous influence of centrifugal force in the radial direction, i.e. to left in FIG. 7 a), surface tension and drag forces from the gas. The effect is streaming in which the sorbent becomes unevenly distributed and flows in streams in places. To solve the problem of streaming, at one or more radial distances form the centre of the RPB a barrier (47), that may be corrugated sheet metal (47), is wrapped all around the inner mass transfer packing (46). A top view of the barrier (47) is shown in FIG. 7 b).

The shape of the barrier forms troughs (48) in which ponds of the sorbent form. The centrifugal force increases hydrostatic pressure in the liquid pond which can be relatively large even when the level of the sorbent in the pond is only 1-2 mm deep. The sorbent flows out of each pond through narrow slots (49) or perforations in the barrier. A number of different designs of the barrier and troughs are possible, but the characteristic is that sorbent is prevented from continuing its path in radial direction through the mass transfer region of the RPB and is instead redistributed before sprayed though a number of holes or slots (49). The slots (49) are designed so that the flow capacity and pressure drop in the slots (49) is set according to the actual centrifugal force field and intended sorbent level (48).

Between the barrier (47) and mass transfer region (51) is a liquid distribution porous zone (50) made from very fine metal mesh, structural foam or other dense porous media that has a higher flow resistance to the sorbent than the mass transfer region (51). This aids the distribution of sorbent in tangential and axial directions so that the sorbent is evenly/smoothly distributed (52) all over the interface with the packing of the outer mass transfer region (51).

A problem experienced by known designs of RPB is that the axial movement of the gas through an RPB exerts a drag force on the sorbent and the sorbent therefore moves axially as well as radially. The axial movement of the sorbent decreases the concentration of the sorbent in parts of the mass transfer region and therefore decreases the effectiveness of the mass transfer in the RPB.

Embodiments may include providing an axial compensator in a RPB for solving the above problem. The axial compensator can be any implementation of flow deflector that changes the axial position of the sorbent flow through the mass transfer region of an RPB so that the overall flow of sorbent through the RPB is substantially radial.

FIGS. 8 *a*) and b) show an axial compensator according to an embodiment. The axial compensator is a punched and pre-formed sheet metal wrapping (53) around the packing that moves the sorbent flowing through the packing to a lower axial position. A top view of the punched sheet metal is also shown in FIG. 8 *b*). The overall effect on the sorbent flow is indicated with arrow (54). The sheet metal has oval or rectangular slots (55) and can be easily manufactured by punching out the slots on three sides and then the central piece (56) is pressed inward in the same operation. The axial compensator can provide a flow of the sorbent directly into another mass transfer region or, as shown in FIG. 8 *a*), liquid distribution layer (38) may be provided between the axial compensator and the mass transfer region/packing (51). The liquid distribution layer (38) has a higher flow resistance to the sorbent than the mass transfer packing (51) and has the effect of ensuring that the sorbent is evenly distributed on the interface with the mass transfer packing (51).

Another embodiment of axial compensator is shown in FIGS. 9 *a*) and b). Advantageously, the axial compensator may both change the axial component of the sorbent flow and also improve the evenness of the distribution of the sorbent by spraying the sorbent into a layer of high sorbent flow resistance packing material prior to the sorbent flowing in to a packing material with lower flow resistance.

FIGS. 9 *a*) and b) show a flow deflector, that may be a preformed sheet metal (57) with corrugation, forming asymmetrical troughs (58) that allow ponds of sorbent (48) to form. In the bottom of the troughs (58), slots (49) are punched out to create a spray of liquid on to the redistribution packing (38). The overall effect on the sorbent is indicated with the arrows (59).

FIG. 10 shows another embodiment for preventing axial flow of the sorbent reducing the effectiveness of an RPB.

The RPB according to the present embodiment is alternatively shaped such that in a plane that includes the axis of rotation of the RPB, at least the upper surface of the region for mass transfer in the RPB is curved so that the outer parts of the RPB extends in the direction that gas flows through the RPB. The shape of the RPB is based on the expected flow path of the sorbent and this ensures that efficient wetting of the mass transfer region by the sorbent occurs. An advantage of the present embodiment is that there is no re-direction of the sorbent flow by an axial compensator and so the energy efficiency may be improved.

The packing used in embodiments may be, for example, Mellapak™ manufactured by Sulzer (see http://www.sulzer.com/nb/Products-and-Services/Separation-Technology/Structured-Packings/Mellapak-MellapakPlus-Mellapak-Plastic as viewed on Feb. 8, 2017).

Described below are particularly preferable packing materials and constructions of RPBs according to embodiments.

The mass transfer sections/regions of the rotating packed bed preferably comprise a large specific surface area, only cause a low pressure drop of the gas in the axial direction and maintain the sorbent substantially evenly distributed on the surface of the packing material so that most of the surface stays wetted.

Moreover, it is an advantage if the packing stimulates the formation of droplets and liquid film as the liquid moved from the inner perimeter of the RPB towards the periphery so that the active mass transport area is even higher than the actual surface area of the packing.

Embodiments include the use of metal mesh (57) as packing material, as shown in FIG. 11 a). Metal mesh is available in a variety of dimensions, geometries and these properties of the materials can be used to provide a very large porosity and low specific area, or very dense porosity and high specific area. The wire mesh may be a Retimet™ material, such as Retimet™ 80 (see http://nearyou.imeche.org/docs/default-source/Staffordshire-Area/metal-foams-in-aerospace.pdf?sfvrsn=0 as viewed on 14 Sep. 2017).

Metal mesh can be wrapped around the core of the RPB. Alternatively, annular shaped roundels can be stacked on top of each other. By stacking a very open metal mesh with small wire diameter (large ratio pitch/diameter), the resistance of the gas flow in an axial direction is low and the resistance of the sorbent flow in a radial direction is high. If the same metal mesh is spirally wrapped the flow resistance properties are the opposite.

From a design and construction point of view it is advantageous for the mesh to be spirally wrapped around the central chambers of the RPB. By using a very open metal mesh that is spirally wound round the central chambers, it is possible to achieve both low gas flow resistance axially and high flow resistance for the sorbent radially.

FIG. 11 b) shows alternative packing material according to an embodiment. The packing material is formed from a sheet metal with specific corrugation and slots punched so that liquid and/or gas can pass. One simple type of punched pattern (58) is shown in FIG. 11 b). The sheet metal with corrugation is spirally wrapped and the sorbent can flow from one sheet to the other though the cross formed slots. The gas passes in the gaps between the sheet layers, the spacing between which depends on how much the metal tabs (59) are pressed in when punching the slots. Such a design of packing material provides low gas flow resistance in axial direction and effectively holds back and distributes sorbent over a large area in radial direction. Embodiments include numerous variations of the geometry of a punched pattern. It is also possible to cut out roundels of punched metal sheets and stack these in axial direction. The preferred geometry for a roundel metal sheet is different from that when the metal sheet is spirally wound. More openings (58) are required to allow a large gas flow capacity.

Embodiments include forming one or more indentations in a planar sheet of metal mesh. For example, a planar sheet of metal mash may be passed through a pair of closely spaced rollers with there being one or more protrusions, and optionally corresponding indentations, in the surface of the rollers so that passing the planar sheet of metal mesh through the rollers forms indentation(s) in the metal mesh. Advantageously, when the metal mesh is wrapped spirally around the core of an RPB, the spacing between adjacent coils of the metal mesh is dependent on the size of the indentation(s). The density of the mesh when it is wound around the core of an RPB can therefore be set at as desired by the RPB manufacturer by controlling the size of the indentation(s) made in the planar sheet.

The assembly of a complete RPB according to embodiments is described below.

An RPB according to embodiments preferably has a variable specific area in the radial direction, low gas flow resistance in an axial direction, is configured to keep sorbent evenly distributed all over the packing material and compensation for the axial movement of the sorbent. The RPB preferably also has a simple and robust design.

FIG. 12 shows part of an RPB according to an embodiment. The RPB comprises the liquid distribution system as described in an earlier embodiment with reference to FIG. 4. The geometry details of the packing is not shown to scale. The dimensions of the mesh that provides packing material are typically in millimetre range whereas overall geometry of the RPB will typically be in the meter range.

The RPB has a liquid distribution layer (60)/(38) at the inner perimeter. This is a dense wire mesh with small wire diameter spirally wrapped to a thickness of some millimetres or centimetres. Outside of this is the less dense inner mass transfer packing (61) that is also a spirally wound wire mesh. Axial compensation and sorbent redistribution is provided by layers (62) and (63), based on the techniques as described with reference to FIG. 9, that moves the liquid downwards to compensate for axial drag of the sorbent that occurs in the inner mass transfer packing (61). The next mass transfer packing (64) is preferably constructed from a more dense wire mesh than (61) because the centrifugal force field is higher and the liquid flux is lower because of the increasing diameter of the RPB. Another zone for axial compensation and liquid redistribution is then provided by (65), (66) as well as outer mass transfer packing (67). The outer mass transfer packing (67) is preferably a denser packing than mass transfer packing (64).

Accordingly, a cross-section of the RPB in a plane that includes the axis of the RPB comprises a plurality of radially spaced sections, with the separation between adjacent sections being provided by an axial compensator and/or sorbent redistributor, or a component comprised by an axial compensator and/or sorbent redistributor. There may be any number of sections. Preferably, the number of sections is in the range 2 to 20.

Embodiments also include there being only one section and there being no axial compensator or sorbent redistributor other than (60).

For example, a RPB according to an embodiment for the flue gas from a single GM LM2500 gas turbine may have a diameter of 3-5 m for a superficial gas velocity of 3 to 10 m/s. The inner diameter of the RPB will be about a third of the outer diameter, so that the radial thickness of a single rotated part of the mass transfer region of the RPB, i.e. from (60) to (67) as shown in FIG. 12, is between 1-2 m. The RPB may comprise up to 10 different mass transfer sections, with liquid redistribution and/or axial compensation between each section. It is not necessary to use different packing material in each section. However, at least 2-4 different packing materials are used. The used packing materials preferably have a specific area in the range 100-1000 m$^2$/m$^3$.

To ensure that there is a low flow resistance of the gas, a packing arrangement as shown in FIG. 13 may be used within each of the mass transfer sections. There are alternate layers of a tight packing layer, with a radial thickness of a few millimetres and a loose packing layer, with a radial thickness of a few centimetres. The tight packing layer may have specific area of 1000-4000 m$^2$/m$^3$.

FIG. 14 shows an alternative design of an RPB according to an embodiment. Annular shaped sheets of wire mesh are stacked on top of each other in the axial direction to form the mass transfer section of the RPB. There are also liquid redistribution section as described for the embodiment shown in FIG. 12. Annular shaped sheets of different diameters are required in order to assemble the RPB with internal liquid redistribution. The mesh geometry can be varied in both axially and radially. Constructing an RPB in this manner allows the properties of the packing material to be easily varied both radially and axially as is necessary for ensuring the most appropriate performance of the RPB.

Another assembly of an RPB according to an embodiment is shown in FIG. 15. The RPB is constructed by spirally wrapping sheet metal with punched pattern (58), as shown in FIG. 11 b), around the central chambers of the RPB. The RPB is otherwise the same as in that shown in FIG. 12. For applications with very viscous sorbents, forming the RPB with sheet metal is preferable.

Another assembly of an RPB according to an embodiment is shown in FIG. 16. In this embodiment, roundels of corrugated and slotted sheets are stacked on top of each other in the axial direction to form the mass transfer section of the RPB. Although liquid redistributors and axial compensators are not shown in FIG. 16, they may also be included as shown and described for other embodiments.

An advantage of the embodiment in FIG. 16 is that the geometry of the corrugation and slots can be easily varied in radial direction for any of the sheets. The geometry of the sheets can therefore be configured as appropriate given the variation in centrifugal force and liquid flux. Moreover, the geometry can easily be constructed with flaps that guide the liquid flow against the gas flow so that any drag of the liquid in axial direction is opposed in the mass transfer packing.

When using stacked roundels a much more open pattern than that shown in FIG. 11 b) may be used. There may openings for gas to pass axially at an appropriate rate for preventing high pressure drops from build up. The open area in the axial direction is preferably about 75% or more in the application of CO$_2$ capture from exhaust gas.

FIG. 17 shows a packing design according to an embodiment with dense V-shaped slots with the triangular flap inside the V bent up to create openings for the gas flow. The slot may also be organised in circular paths around the axis of rotation of the RPB to advantageously provide the same mass transfer properties at all tangential positions. The V-slots preferably has a width in the order of a few millimetres to centimetres, and the sheet metal preferably has some hundred micron in thickness. The slots may also have circular, rectangular or other shapes.

FIGS. 18 a) and b) show static vanes for use in an RPB system according to an embodiment.

FIGS. 18 a) and b) show static vanes (23) that are preferably installed between adjacent RPBs in an RPB system comprising a plurality of RPBs. The vanes adjust the radial velocity profile of the gas after leaving an RPB and before entering the next RPB.

After passing through an RPB, the gas has an increased tangential/rotational velocity component. The purpose of the vanes is to reduce this and convert the excess velocity component to static pressure and thereby reduce the total pressure drop over the RPB system. The vane(s) before a first RPB stage are preferably shaped to set up a specific profile that is appropriate for maximising the mass transfer in the RPB system. The vane(s) between adjacent RPBs re-establish the profile and the vanes after last stage are preferably configured to recover as much of the velocity to static pressure as possible. The static vanes are fixed to the outer cylindrical housing (21) of the RPB system and, as shown in FIG. 18 a), extend almost to the rotating shaft (1). The profile of the vanes varies from inner to outer radius. The variable profile of a vane (23) is shown by radial and axial cross sections in FIGS. 18 a) and b). An approximate gas flow vector (69) at a radial position is also shown. This indicates the function of the static vanes, namely to reduce the magnitude of the velocity vector and to redirect velocity in a mainly axial direction. The velocity magnitude is reduced as a result of the diffusor like design of the vane profile, and the dynamic pressure will be regained provided the profile is appropriately designed, according to known techniques in aerodynamics. The tangential gas flow velocity is smaller near the inner radius of the flow annulus, therefore the conversion of tangential velocity to static pressure will be lower there and, as shown in FIG. 18 a), the vane profile is preferably varied to compensate for this.

Another advantage of the vanes is that they cool the gas before entering each RPB stage.

FIG. 19 shows an RPB system that comprises a plurality of sections with each section comprising one of the RPBs according to any of the previously described embodiments. The axis of the RPB system is aligned vertically and the RPBs are in a stacked configuration along the same axis. The RPB system comprises a drive system (1906) that rotates the RPBs.

Although not shown in FIG. 19, the RPB system may also comprise a computing system for automatically controlling electronically controllable parts of the RPB system. The electronically controllable parts of the RPB system may include the drive system (1906), the flow rate of liquid into each RPB (as described later, this may be controlled by controlling the flow rate of liquid out of a liquid collection chamber (1911) and flow path corresponding to an RPB) and the flow rate of gas into the RPB system.

The RPB system comprises a gas input (1901). The gas input (1901) is arranged so that the flow of gas through the gas input (1901) is orthogonal with the axis of the RPB system. In FIG. 19 the axis of the RPB system is aligned vertically and so the gas input (1901) is aligned horizontally.

A spray system may be provided between the gas input (1901) and the lowest RPB section. The spray system receives water from water inlet (1903) and sprays water into the gas so as to saturate the gas with water. This is a quenching operation that both cools the gas and increases the humidity of the gas. This can assist gas capture by a liquid sorbent, such as carbon dioxide capture by an amine.

The gas flows into the lowest section of the RPB system. The lowest section of the RPB system preferably does not comprise an RPB. As shown in FIG. 19, in a cross-section of the RPB system that comprises the axis of the RPB system, the base of the lowest section is conically shaped. In a cross-section that is substantially orthogonal to the axis of the RPB system, all of the sections of the RPB system are substantially circular. The shape of the lowest section, and direction of gas flow horizontally into the lowest section, causes the gas to spin round the axis of the RPB system in the lowest section. This has the effect of the gas vertically leaving the lowest stage with a spin. Preferably, at least the lowest RPB stage is operated to spin in the same direction and with about the same rotational speed as the gas that flows out of the lowest section. This maintains the velocity of the gas flow. When the gas has been passed through the spray system, the spinning of the gas in the lowest section of the RPB system may also remove excess water from the gas flow before the gas flows into an RPB because the lowest section may effectively act as a cyclone separator of the gas and water. There is therefore an outlet (1904) for water in the lowest section.

The gas flows out of the lowest section and into the first of a series of RPBs. The first three RPBs are gas capture RPBs. Each gas capture RPB has a sorbent input with the sorbent being supplied up to each RPB from a sorbent flow (1905) through the base of the RPB system. Each of the first three gas capture RPBs may be as described earlier with reference to FIGS. 1 to 18. Preferably, each of the gas capture RPBs is as described earlier for a variant of what is shown in FIG. 4 in which the ports (33) between the compartment (32) and the ring volume (34) are all be arranged in the same plane, with the plane being orthogonal to the axis of the RPB.

Each RPB may be provided with a separate sorbent supply from the other RPBs. This allows different sorbents, and/or different types of the same sorbent, to be supplied to the PBs. Alternatively, the same sorbent may be provided to all of the RPBs with the sorbent circulating through the RPBs. For example, the sorbent may be supplied to the highest RPB. Sorbent that has flowed through the highest RPB may be supplied to the sorbent input of the RPB that is immediately below the highest RPB. The sorbent that has flowed through this RPB may be supplied to the sorbent input of the RPB immediately below it with this arrangement repeating until the lowest RPB is reached and the sorbent flows out of the RPB system.

After the gas has flowed through the three gas capture RPB stages that provide mass transfer between the gas and a liquid sorbent, the RPB system may be arranged, as shown in FIG. 19, so that the gas flows through two washing RPBs. Each washing RPB has the purpose of washing any droplets and/or aerosols of sorbent that are in the gas stream so as to significantly reduce the concentration of any sorbent in the gas stream output from the RPB system. Each washing RPB may have a spray system that receives water at a water input, (1907) or (1909), and sprays water into the gas. The water may be collected by a liquid collection chamber (1911), as shown in FIG. 19 and described below, and output through a water output for the RPB, respectively (1908) or (1910). Embodiments also include there being no spray system for each washing RPB and instead the water being supplied to each washing RPB through a central chamber in the RPB in a similar way to how sorbent is supplied to a gas capture RPB.

The gas then flows into the upper section of the RPB system. The upper section has a horizontal gas output (1902). The gas spins in the upper section of the RPB system. The upper section of the RPB system effectively acts as a cyclone separator and this reduces the amount of liquid in the gas that exits the RPB system through the gas output.

The gas output (1902) is preferably arranged to extend into the upper section of the RPB system so that the inlet of the gas output (1902) is not flush with the inner surface of the upper section but the inlet of the gas output (1902) is instead close to the centre of the upper section. Any liquid in the spinning gas that flows into the upper section mostly flows along, or close to, the inner walls of the upper section due the centrifugal force on the liquid. This liquid is prevented from flowing through the inlet of the gas output (1902) because the inlet extends away from the inner surface into the upper section. The liquid therefore flows downwards and may flow into a liquid collection chamber (1911), as shown in FIG. 19 and described below. One or more baffles/vanes may be provided to assist the downward flow of liquid out of the upper section.

The number of gas capture RPBs is not restricted to three and embodiments include there being one or more gas capture RPBs. For example, the number of gas capture RPBs may be 1, 2, 5, 10 or more.

The number of washing RPBs is not restricted to two and embodiments include there being no washing RPBs, or one or more washing RPBs. For example, the number of washing RPBs may be 0, 1, 2, 5, 10 or more.

The RPB system may also comprise one or more dry RPBs. A dry RPB is an RPB that has no liquid provided to it and has the purpose of removing liquid and/or demisting the gas that flows through it. For example, the top RPB in FIG. 19 may be a dry RPB. A washing RPB can be operated as a dry RPB by not supplying any water through the water input of the RPB. The number of dry RPBs may, for example, be 0, 1, 2, 5 or more.

As shown in FIG. 19, each of the RPBs has a corresponding liquid collection chamber (1911) for collecting liquid that flows through the RPB. In a cross section that is orthogonal to the axis of the RPB system, each liquid collection chamber (1911) is annular and encircles the entire corresponding RPB. In the cross section shown in FIG. 19, in which the cross-section comprises the axis of the RPB system, each liquid collection chamber (1911) is arranged so that the highest part of the liquid inlet to the liquid collection chamber (1911) is positioned lower, or at substantially the same height as, the height of the bottom of the RPB that the liquid collection chamber (1911) corresponds to. The liquid inlet to each chamber (1911) may be a conical section so that liquid flowing down the inner wall of the RPB system is directed to flow through the liquid inlet. As shown in FIG. 19, the liquid collection chambers (1911) effectively result in part of the RPB system having double outer walls with the liquid collection chambers (1911) being provided within the double outer walls.

Preferably, the liquid in each liquid collection chamber (1911) is pumped out of the liquid collection chamber (1911) by a corresponding variable speed pump (1913). The liquid is preferably arranged to flow via a level sensor (1912). The level sensor preferably comprises both an electronic level sensor, such as a radar based sensor, and also a level glass that provides a visual indication of the liquid level in the liquid collect chamber (1911). An automatic liquid level controller may also be provided.

Each electronic level sensor may be arranged to automatically measure the liquid level in a liquid collection chamber (1911) and communicate the level to the computing system. The computing system may be arranged to control the automatic liquid level controller of each liquid collection chamber (1911) so that the flow rate of liquid out of each liquid collection chamber (1911) can be automatically controlled. The computing system is preferably arranged to output data indicating the amount of liquid in each liquid collection chamber to a display device so that an operator of the RPB system can easily determine the liquid level in each liquid collection chamber (1911).

The level glass will always provide a visual indication of the liquid level in the liquid collection chamber (1911) even when the computing system is not operating.

The sorbent that flows out of each liquid collection chamber may either be supplied to the sorbent input of an RPB or flow out of the RPB system through a sorbent output (1914) of the RPB system.

When the sorbent that flows out of a liquid collection chamber is supplied to the sorbent input of an RPB, the flow rate of the sorbent supplied to the RPB is controllable by the variable speed pump, and any other liquid level controller, in the flow path of the sorbent. When the flow rate of sorbent collected through an inlet of a liquid collection chamber (1911) is greater than the supplied flow rate of sorbent to the next RPB that the sorbent is supplied to, the amount sorbent in the liquid collection chamber and other parts of the sorbent flow path will increase. To the extent that the sorbent can increase, there is a buffer in the sorbent flow path that allows the flow rate of sorbent through each the RPBs to be individually controlled. Preferably, the provided buffer volume of sorbent is sufficiently large to allow an appropriate range of individual control of the sorbent flow rates in the different RPBs in the RPB system. A disadvantage of increasing the buffer volume is that the RPB system becomes less compact as the buffer volume is increased. The performance of the sorbent may also decrease when the buffer capacity is increased.

The sorbent that flows out of the RPB system is preferably regenerated by a sorbent regenerator and then supplied back into the RPB system. A sorbent regenerator releases from the sorbent, in a contained environment, the gas that was captured. The regenerated sorbent can then be supplied back to the sorbent input of the RPB system so that the sorbent is recirculated. The sorbent regenerator of the RPB system may, for example, be the regenerator disclosed in U.S. Ser. No. 14/888,241.

FIG. 20 shows an embodiment of an RPB system in which the axis of the RPB system is aligned horizontally.

The implementation of the RPB system in FIG. 20 may comprise all of the features as already described for the vertically aligned RPB system shown in FIG. 19 but, where necessary, the alignment of the features changed from horizontal to axial. For example, in the present embodiment, the gas input (1901) is now at the left hand side of the RPB system and the gas output (1902) is at the right hand side of the RPB system. The first section of the RPB system still has a gas flow into the first section that is orthogonal to the axis of the RPB system and this assists the separation of liquid from the gas stream. Similarly, the last section of the RPB system still has a gas flow out of the las section that is orthogonal to the axis of the RPB system and this assists the separation of liquid from the gas stream.

The RPB system may comprise three gas capture RPBs and two washing RPBs as previously described with reference to FIG. 19.

In FIG. 20, the water is supplied into the washing RPBs through a central chamber of the RPBs, in a similar way to how sorbent is supplied to the gas capture RPBs as shown in FIG. 19. Alternatively, water spray systems may be provided for each washing RPB as described earlier for the vertically aligned RPB system.

A difference between the implementation of the horizontally aligned RPB system and the vertically aligned RPB system may be that barriers (2003) are provided between each of the RPBs to limit the extent of the flow of sorbent horizontally along the inner wall of the RPB system. In a cross-section of the RPB system that is orthogonal to the axis of the RPB system, each barrier is annular.

Another difference between the implementation of the horizontally aligned RPB system and the vertically aligned RPB system may be that baffles (2002) are provided along the inner walls of the RPB system for each of the sections of the RPB system that comprise either an RPB or the gas output. The purpose of the baffles (2002) is to guide liquid that has flowed through an RPB down to liquid collection chambers at the bottom of each RPB. The baffles (2002) may reduce the amount of liquid that falls back onto the RPBs and thereby reduce the amount of liquid build-up and sloshing. Liquid build-up and sloshing may increase the required power to rotate the RPBs at the desired speed.

A design of baffle (2002) that may be used is shown in FIG. 21. In a cross section that comprises the axis of the RPB system, the baffles (2002) may comprise a connected, e.g. welded, series of cones with openings at the furthest apexes of each cone from the axis of the RPB system. Liquid collects in troughs between each apex and the troughs direct the flow of liquid down to openings in the outer wall of the RPB system so that liquid can flow into liquid collection chambers (2001) below each RPB.

Embodiments also include an alternative design of baffle (2002) that is made by forming a large number of holes in a cylindrical screen. The holes may be punched into the walls of the cylindrical screen from the inside out.

Embodiments may also include any of the ways for directing the flow of a liquid that has flowed through an RPB that are described in U.S. Ser. No. 10/168,047.

The RPB system according to embodiments may include other components that are not shown in FIGS. 19 and 20. For example, the RPB system may include one or more cooling systems for cooling the sorbent and/or flue gas between adjacent RPB stages.

The computing system is preferably arranged so that it automatically controls the operation of the RPB system. The computing system preferably automatically controls the RPB system to operate with high efficiency given the circumstances, i.e. the content and rate of the received gas stream. The computing system may automatically control the RPB system to operate with high efficiency by automatically controlling one or more of the flow rate of sorbent supplied to each RPB, the rate of rotation of each RPB, the flow paths of sorbent through the RPB system, the type of sorbent supplied to each RPB and the flow rate of gas into the RPB system. The drive system may only be able to rotate RPBs with the same speed of rotation. The computing system can then only control the speed of rotation of all of the RPBs together. Alternatively, there may a plurality of drive systems, or other mechanisms, such that the computing system can individually control the speed of rotation of the RPBs.

An example of an application of embodiments is provided below.

Embodiments are particularly advantageous in the application of $CO_2$ capture from a flue gas.

Embodiments provide a CCS absorber with a significant reduction in footprint and height compared to conventional packed columns. This can be achieved by operating a CF-RPB absorber according to embodiments with gas flow velocities 1 order of magnitude higher and mass transfer rates per unit packing volume 1-2 orders of magnitude higher than known techniques.

Known packed columns operate with a superficial gas flow velocity in the order of 1 m/s. A CF-RPB of embodiments my operate with a superficial gas flow velocity in the order of 10 m/s.

On offshore oil and gas installations, gas turbines are often used for power production and a typical installation will have 2 to 4 gas turbines installed. A typical unit is the GE LM2500 with a 22-24 MW power output. The exhaust gas flow is typically about 60 kg/s. The gas is preferably cooled to a temperature of 40-60° C. before entering the $CO_2$ absorber, and the specific volume is therefore about 1 $m^3$/kg. An absorber system for processing the exhaust from one LM2500 gas turbine should therefore be able to handle an exhaust gas flow of about 60 $m^3$/s. A known packed absorber operating at a superficial velocity of 2 m/s will need to have a cross section of 30 $m^2$. However, when the absorber is a CF-RPB according to embodiments and it is configured to operate at 10 m/s, the required cross section reduces to 6 $m^2$.

Accordingly, CF-RPBs according to embodiments are particularly advantageous for CCS on offshore platforms.

In a preferred embodiment, a CF-RPB operates with superficial gas flow velocities in the order of 5-15 m/s and $CO_2$ absorption rates of about 2 mol $m^{-3}$ $s^{-1}$ or higher. At the same time, the power consumption for rotation of the CF-RPB system and the power usage for compensating for the pressure drop though the system should be less than 5% of the energy output of a gas turbine, that is about 1 MW.

Embodiments also include CF-RPBs for full size coal fired power plants. A conventional coal fired power plant produces 550 MWel release 131 kg/s $CO_2$, see e.g. NETL 2013 Case 9: NETL, 2013. Cost and Performance Baseline for Fossil Energy Plants, Volume 1: Bituminous Coal and Natural Gas to Electricity. DOE/2010/1397, Revision 2a. This gives about 600 $m^3$/s flue gas to the $CO_2$ absorber.

Embodiments advantageously provide an absorber that may have about one fifth of the cross section of known systems and are therefore a significant improvement and suitable for retrofitting CCS to existing power plants.

Although embodiments have been presented with the gas to be cleaned being flue gas, embodiments may be used with any gas and are not restricted to being a flue gas from a combustion process. The gas to be cleaned may be referred to as a dirty gas. The dirty gas may be sour gas directly output from a well head. The sour gas would be cleaned by capturing the hydrogen sulphide content. Embodiments also include cleaning gasses in industries such as the power generation industry, the metal production industry, cement production industry and mineral processing industry. In particular, embodiments can be used to clean gasses from cement production processes, blast furnace processes, steel production processes and reforming processes (e.g. for hydrogen production).

Another application of embodiments is in a hydrogen production process. It is known for hydrogen to be produced by sorption-enhanced reforming, SER. In this process methane and steam are converted into gas mixture that substantially comprises hydrogen and carbon dioxide. An RPB system according to the embodiments described herein, that may be operated with an amine sorbent, is particularly appropriate for separating the carbon dioxide from the gas mixture in order to obtain substantially pure hydrogen.

In an implementation of embodiments, there is provided a rotating packed bed, RPB, for mass transfer between a sorbent and a gas, the RPB comprising: a central chamber arranged to receive a flow of a sorbent that is a liquid; and a flow path for the sorbent between the central chamber and a region for mass transfer between a gas and the sorbent; wherein, in use, the flow of sorbent through the region for mass transfer is substantially in cross-flow with the flow of gas through the region for mass transfer.

Preferably, the RPB further comprises: first packing material; and second packing material that is configured to provide the region for mass transfer between the gas and the sorbent; wherein, in use: the first packing material is arranged to receive sorbent from the central chamber; the second packing material is arranged to receive sorbent from the first packing material; and the sorbent flow resistance of the second packing material is less than the sorbent flow resistance of the first packing material.

Although the above-identified features are preferable, these features are not essential to implementations of embodiments. Implementations of embodiments may therefore not comprise the above-identified preferable features but further comprise any of the other features as described herein with reference to any of FIGS. 1 to 21.

Embodiments include various modification and variations to the above described techniques.

The RPBs according to embodiments may have a wide range of dimensions. Preferably, the inner diameter of the annular RPB, i.e. the diameter of the central hole in the annulus, is in the range 0.5 m to 4 m. Preferably, the outer diameter of the annular RPB is in the range 3 m to 10 m. Preferably, the inner diameter of the annular RPB is one third of the outer diameter of the annular RPB.

The RPB may be operated so that it has a centrifugal force that is preferably in the range 10-100 G, and the centrifugal force is more preferably 60 G.

At least FIG. 4 shows a first layer of packing material (38) that is enclosed by a region for mass transfer (6), (7), (8) and (9). The first layer of packing material differs from the region for mass transfer by having a higher flow resistance to sorbent and has the purpose of improving the uniformity of the distribution of the sorbent as it flows into the region for mass transfer. However, the first layer of packing material (38) is not essential and embodiments also include all of the implementations of RPB disclosed herein not having the first layer of packing material (38). In particular, the RPB as shown in FIG. 6 can inherently have good uniformity of the distribution of the sorbent as it flows into the region for mass transfer due to the spacing between the nozzles and the packing. In addition, all of the implementations of RPB disclosed herein may have such a spacing between the region for mass transfer region and the nozzles.

Embodiments also include a plurality of RPB systems arranged in parallel with each other. A gas splitter splits an input gas flow into a plurality of separate gas flows. Each of the separate gas flows are then directed to one of the plurality of RPB systems. A gas combiner then combines the separate gas flows out of each of the plurality of RPB systems. Advantageously, higher volume gas flows can be handled than by a single RPB system and each individual RPB system can still be compact. The number of available RPB systems that are used is also adaptable as turning on and off any on the separate gas flows at the gas splitter will change the number of RPB systems that are used. Appropriate determination of the number of RPB systems used can increase the efficiency of each individual RPB system and thereby increase the overall efficiency of the entire system.

Depending on the expected change in CO2 loading of the absorbent over the RPB and corresponding change in CO2 concentration in the flue gas, the sorbent may preferably be introduced with a specific axial profile for the flow rate per unit axial length. Similarly for the flue gas flow, it is advantageous to design the system so that gas flow rate per area unit for the radial—tangential plane has a specific profile in radial direction. This variations in the chemical driving force for the mass transfer in the radial—axial plane can then be matched with the variations in liquid surface area and renewal rate. The RPB system according to embodiments may therefore be designed with these properties.

The flow charts and descriptions thereof herein should not be understood to prescribe a fixed order of performing the method steps described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A gas capture system comprising:
   a rotating packed bed, RPB, system; and
   a gas supply arranged to provide a gas flow into the RPB system, wherein the gas flow is a gas mixture that comprises carbon dioxide gas;
   wherein the RPB system comprises a RPB arranged to provide mass transfer from the gas flow to a sorbent so as to reinduce the concentration of carbon dioxide in the gas flow, the RPB comprising:
   a central chamber arranged such that, in use, the central chamber receives a flow of a sorbent that is a liquid; and
   a flow path for the sorbent between the central chamber and a region for mass transfer from the gas to the sorbent;
   wherein, in use, the flow of sorbent through the region for mass transfer is substantially in cross-flow with the flow of gas through the region for mass transfer;
   wherein the RPB further comprises:
   first packing material; and
   second packing material that is configured to provide the region for mass transfer between the gas and the sorbent;
   wherein, in use:
   the first packing material is arranged to receive sorbent from the central chamber;
   the second packing material is arranged to receive sorbent from the first packing material; and
   the sorbent flow resistance of the second packing material is less than the sorbent flow resistance of the first packing material.

2. The gas capture system according to claim 1, wherein the central chamber, first packing material and second packing material are configured such that, in a cross section of the RPB:
   the central chamber is circular;
   the first packing material and second packing material are annular;
   the central chamber, first packing material and second packing material are concentric;
   the second packing material encloses the first packing material; and
   the first packing material encloses the central chamber;
   wherein, in use, the distribution of the sorbent on the interface between the first and second packing materials is substantially uniform.

3. The gas capture system according to claim 1, wherein the RPB comprises a plurality of nozzles arranged in the flow path of the sorbent between the central chamber and the region for mass transfer:
   the RPB further comprising a second chamber;
   wherein:
   an outer wall of the second chamber comprises the plurality of nozzles;
   an inner wall of the second chamber comprises one or more openings arranged to provide a flow path of sorbent within the central chamber to the second chamber; and
   in a cross section of the RPB, the second chamber is annular, the first packing material encloses the second chamber, and the second chamber encloses the central chamber.

4. The gas capture system according to claim 1, further comprising one or more sorbent redistribution systems, wherein each sorbent redistribution system comprises:
   an inner annular ring of packing material; and
   an outer annular ring of packing material,
   wherein in use, sorbent is received by the inner annular ring of packing material and flows through the inner ring of packing material to the outer ring of packing material;
   the outer annular ring of packing material is arranged to provide a region of mass transfer;
   the sorbent flow resistance of the outer annular ring of packing material is less than the flow resistance of the inner annular ring of packing material; and
   the inner and outer annular rings of packing material are configured such that, in a cross section of the RPB:
   the inner and outer annular rings of packing materials are annular and concentric with the central chamber; and
   the outer annular ring of packing material encloses the inner annular ring of packing material;
   the RPB further comprising a barrier between the inner annular ring of packing material and source of the flow of sorbent;
   wherein the barrier comprises openings arranged such that, in use, the sorbent flows through the barrier into the inner annular ring of packing material;
   wherein the inner annular ring of packing material has substantially the same sorbent flow resistance as the first packing material;
   the outer annular ring of packing material has substantially the same sorbent flow resistance as the second packing material; and
   the inner annular ring of packing material encloses the second packing material.

5. The gas capture system according to claim 1, further comprising one or more axial compensators, wherein each axial compensator comprises a flow deflector that, in use, changes the axial component of the flow of sorbent through the RPB such that the axial component of the flow of sorbent from an inner surface of the RPB to an outer surface of the RPB is reduced:

wherein, in use, the flow of sorbent from the inner surface of the RPB to the outer surface of the RPB is substantially radial;
wherein one or more of the axial compensators comprises: an inner annular ring of packing material; and an outer annular ring of packing material;
wherein in use, sorbent is received by the inner annular ring of packing material and flows through the inner ring of packing material to the outer ring of packing material;
the outer annular ring of packing material is arranged to provide a region of mass transfer;
the sorbent flow resistance of the outer annular ring of packing material is less than the flow resistance of the inner annular ring of packing material; and
the inner and outer annular rings of packing material are configured such that, in a cross section of the RPB:
the inner and outer annular rings of packing materials are annular and concentric with the central chamber; and
the outer annular ring of packing material encloses the inner annular ring of packing material.

6. The gas capture system according to claim 5, wherein the flow deflector is a punched metal sheet comprising a plurality of openings.

7. The gas capture system according to claim 1, wherein, in a plane that includes the axis of rotation of the RPB, at least one surface of the region for mass transfer in the RPB is curved such that the outer circumference of the RPB extends in the direction that gas flows through the RPB.

8. The gas capture system according to claim 1, wherein the regions for mass transfer have higher radial resistance to the flow of sorbent than axial resistance to the flow of gas.

9. The gas capture system according to claim 1, wherein one or more of the packing materials comprises a metal mesh, and the sorbent flow resistance of each packing material is dependent on the density of the mesh.

10. The gas capture system according to claim 1, wherein one or more of the packing materials is formed by forming slots in a corrugated metal sheet.

11. The gas capture system according to claim 1, wherein, in a cross section of the RPB, the RPB comprises a plurality of annular concentric sections; and each of the sections comprises an inner annular ring of packing material that is enclosed by an outer annular ring of packing material, wherein the outer annular ring of packing material has a lower sorbent flow resistance than the inner annular ring of packing material;
wherein the number of sections is in the range 2 to 20 and preferably in the range 2 to 6; and
wherein the sorbent flow resistance of the outer annular ring of packing material is dependent on the radial thickness of the outer annular ring such that sorbent flow resistance increases as the radial thickness of the annular ring increases.

12. The gas capture system according to claim 1, wherein the RPB comprises one or more axial compensators.

13. The gas capture system according to claim 1, wherein the RPB comprises one or more sorbent redistribution systems.

14. The gas capture system according to claim 1, wherein, in a plane that includes the axis of rotation of the RPB, the sorbent flow resistance of one or more of the packing materials increases in the direction that gas flows through the RPB.

15. The gas capture system according to claim 1, wherein:
the outer diameter of the RPB is in the range 1 m to 12 m and preferably in the range 3m to 10m; and
the inner diameter of the RPB is in the range 0.1 m to 6 m and preferably in the range 0.5 m to 4 m.

16. The gas capture system according to claim 1, wherein the first packing material and the second packing material are manufactured from the same material.

17. The gas capture system according to claim 1, wherein, in use, the sorbent is a sorbent of carbon dioxide gas; and
wherein, in use, the gas that flows into the RPB is a gas mixture that comprises hydrogen, carbon dioxide and nitrogen.

18. The gas capture system according to claim 1, wherein the RPB system comprises:
one or more RPBs;
a rotatable shaft that comprises the central chamber of each RPB; and
one or more conduits within the shaft for suppling sorbent to each central chamber within the rotatable shaft,
wherein the inner wall of a second chamber of each RPB is a wall the shaft.

19. The gas capture system according to claim 1, wherein the RPB system comprises:
one or more RPBs;
a stationary shaft that comprises the central chamber of each RPB; and
one or more conduits within the stationary shaft for suppling sorbent to each central chamber within the rotatable shaft,
wherein each RPB is arranged to rotate about the stationary shaft.

20. The gas capture system according to claim 1, wherein:
the RPB system comprises a plurality of RPBs, all of which are arranged along the same axis of rotation;
the axis of rotation is substantially vertical; and
the gas capture system comprises one or more conduits arranged so that there is a gravity driven flow that provides sorbent that has flowed through a first one of the RPBs to the sorbent inlet of a second one of the RPBs.

* * * * *